United States Patent
Seno et al.

(10) Patent No.: US 8,840,511 B2
(45) Date of Patent: Sep. 23, 2014

(54) VEHICLE DRIVE DEVICE

(75) Inventors: Masamitsu Seno, Anjo (JP); Hirotaka Yata, Kariya (JP); Natsuki Sada, Anjo (JP); Takuya Komatsu, Anjo (JP); Tomoo Atarashi, Kariya (JP); Michinobu Suzuki, Toyota (JP); Hiromichi Kimura, Okazaki (JP); Michitaka Tsuchida, Miyoshi (JP)

(73) Assignees: Aisin AW Co., Ltd., Anjo (JP); Toyota Jiddosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/981,181

(22) PCT Filed: Jan. 16, 2012

(86) PCT No.: PCT/JP2012/050680
§ 371 (c)(1),
(2), (4) Date: Jul. 23, 2013

(87) PCT Pub. No.: WO2012/105299
PCT Pub. Date: Aug. 9, 2012

(65) Prior Publication Data
US 2013/0305878 A1 Nov. 21, 2013

(30) Foreign Application Priority Data

Feb. 4, 2011 (JP) .................................. 2011-023241

(51) Int. Cl.
| | | |
|---|---|---|
| F16H 57/04 | (2010.01) | |
| F16H 37/06 | (2006.01) | |
| F16H 37/08 | (2006.01) | |
| B60K 6/405 | (2007.10) | |
| B60K 6/445 | (2007.10) | |

(52) U.S. Cl.
CPC ............ *F16H 37/065* (2013.01); *Y02T 10/6239* (2013.01); *F16H 2037/0866* (2013.01); *F16H 57/0423* (2013.01); *F16H 57/0482* (2013.01); *F16H 57/0479* (2013.01); *B60K 6/405* (2013.01); *B60K 6/445* (2013.01); *F16H 57/045* (2013.01); *F16H 57/042* (2013.01)
USPC .......................................... 475/159; 184/6.12

(58) Field of Classification Search
CPC ............ F16H 57/0476; F16H 57/0465; F16H 57/0482
USPC .......................................... 475/159; 184/6.12
See application file for complete search history.

(56) References Cited

U.S. PATENT DOCUMENTS 5,358,456 A * 10/1994 Deppert et al. ............... 475/154
(Continued)

FOREIGN PATENT DOCUMENTS

| JP | U-60-126754 | 8/1985 |
|---|---|---|
| JP | A-2000-217205 | 8/2000 |
| JP | A-2009-79625 | 4/2009 |
| JP | A-2009-149156 | 7/2009 |

(Continued)

OTHER PUBLICATIONS

Apr. 3, 2012 International Search Report issued in International Patent Application No. PCT/JP2012/050680.

*Primary Examiner* — Tisha Lewis
(74) *Attorney, Agent, or Firm* — Oliff PLC

(57) ABSTRACT

A vehicle drive device configured with an input member coupled to an internal combustion engine, a rotary electric machine, an output member coupled to wheels, and a power transfer mechanism that drivably couples the input member, the rotary electric machine, and the output member. An oil collecting portion is configured to collect oil supplied by rotation of the power transfer mechanism, The collected oil falling passage is configured to cause the oil collected by the oil collecting portion to flow downward to be supplied to a portion of a facing wall surface located above a cylindrical member. A communication oil passage communicates between the gap and the inside housing space is formed at a portion of abutment between the subject support bearing and the support projecting portion.

16 Claims, 5 Drawing Sheets

(56) References Cited

U.S. PATENT DOCUMENTS

| | | | |
|---|---|---|---|
| 7,651,425 B2 * | 1/2010 | Shimizu | 475/5 |
| 8,092,337 B2 * | 1/2012 | Tomita et al. | 475/344 |
| 2009/0233749 A1 | 9/2009 | Tomita et al. | |
| 2013/0283972 A1 * | 10/2013 | Yamamoto et al. | 74/665 B |

FOREIGN PATENT DOCUMENTS

| | | |
|---|---|---|
| JP | A-2009-216189 | 9/2009 |
| JP | A-2009-257518 | 11/2009 |
| JP | A-2009-257519 | 11/2009 |
| JP | A-2010-149764 | 7/2010 |

* cited by examiner

VEHICLE DRIVE DEVICE

INCORPORATION BY REFERENCE

The disclosure of Japanese Patent Application No. 2011-023241 filed on Feb. 4, 2011 including the specification, drawings and abstract is incorporated herein by reference in its entirety.

BACKGROUND OF THE INVENTION

The present invention relates to a vehicle drive device including an input member drivably coupled to an internal combustion engine, a rotary electric machine, an output member drivably coupled to wheels, a power transfer mechanism that drivably couples the input member, the rotary electric machine, and the output member, and a case that houses at least the power transfer mechanism.

1. Description of the Related Art

A device disclosed in Japanese Patent Application Publication No. 2000-217205 (JP 2000-217205 A) mentioned below is already known as an example of the vehicle drive device described above. In the following description of the related art, reference numerals and names used in JP 2000-217205 A are cited in parentheses as appropriate. In the device described in JP 2000-217205 A, as shown in FIG. 4 of JP 2000-217205 A, a ring gear (R) serving as an output rotary element of a power distribution device (planetary gear unit 13) is coupled so as to rotate together with a sleeve-like member (output shaft 14) via a flange-like coupling member extending in the radial direction. The sleeve-like member (14) is formed so as to encircle an input member (output shaft 12), and disposed on the engine side in the axial direction and on the radially inner side of the ring gear (R). A counter drive gear (15) serving as an output gear is formed on the outer circumferential surface of an end portion of the sleeve-like member (14) on the engine side in the axial direction.

It is necessary that a rotor (21) of a rotary electric machine (electric generator motor 16), the ring gear (R), and the output gear (15) formed on the sleeve-like member (14) should all be supported so as to be rotatable with respect to a non-rotary member such as a case, and thus are supported by a rotor bearing and an output bearing. Here, in the device described in JP 2000-217205 A, the rotor bearing is disposed between the rotor (21) of the rotary electric machine and the ring gear (R) in the axial direction, and the output bearing is disposed between the ring gear (R) and the output gear (15) in the axial direction. This allows the ring gear (R) to be rotatably supported by the case via a rotor shaft of the rotary electric machine (16) and the rotor bearing, and via the sleeve-like member (14) and the output bearing. The output bearing is disposed in contact with the outer circumferential surface of the sleeve-like member (14) with a relatively small diameter. This allows the output bearing to have a relatively small diameter, which enables a reduction in cost of the output bearing.

SUMMARY OF THE INVENTION

In the device described in JP 2000-217205 A, however, the ring gear (R) of the power distribution device, the sleeve-like member (14), the outer circumferential surface of which is supported by the output bearing, and a connection member that extends in the radial direction to connect the ring gear (R) and the sleeve-like member (14) to each other are disposed side by side in the axial direction. Such an arrangement causes the ring gear, the output bearing, and the sleeve-like member (14) to occupy a large space in the axial direction in the device, which disadvantageously increases the axial dimension of the entire device. Meanwhile, it is conceivable to dispose the ring gear, the output bearing, and the sleeve-like member (14) so as to overlap each other as seen in the radial direction in order to reduce the axial length of a space in which the ring gear, the output bearing, and the sleeve-like member (14) are disposed. However, such an arrangement may make it difficult to supply oil to some of gears, bearings, and so forth, which may hinder appropriate lubrication.

In view of the foregoing, it is desirable to provide a vehicle drive device in which the axial dimension of the entire device can be reduced to be small and various portions can be lubricated appropriately.

An aspect of the present invention provides a vehicle drive device including an input member drivably coupled to an internal combustion engine, a rotary electric machine, an output member drivably coupled to wheels, a power transfer mechanism that drivably couples the input member, the rotary electric machine, and the output member, and a case that houses at least the power transfer mechanism. In the vehicle drive device, the power transfer mechanism includes a cylindrical member and an inside gear mechanism; the inside gear mechanism meshes with internal teeth provided on an inner circumferential surface of the cylindrical member, and is housed in an inside housing space formed on a radially inner side of the cylindrical member; the cylindrical member is rotatably supported from the radially inner side by two support bearings disposed on both sides in an axial direction across the inside gear mechanism; the case includes a support wall portion, and an oil collecting portion and a collected oil falling passage are provided inside the case; the support wall portion includes a facing wall surface that faces an axial end surface of the cylindrical member via a gap and that extends to a radially outer side of the cylindrical member, and a support projecting portion formed on the radially inner side of the cylindrical member so as to project from the facing wall surface toward the cylindrical member; the support projecting portion abuts against a subject support bearing, which is one of the support bearings located on a facing wall surface side, to support the subject support bearing at least from the radially inner side; the oil collecting portion is disposed above the cylindrical member, and configured to collect oil supplied by rotation of the power transfer mechanism; the collected oil falling passage is configured to cause the oil collected by the oil collecting portion to flow downward to be supplied to a portion of the facing wall surface located above the cylindrical member; and a communication oil passage that communicates between the gap and the inside housing space is formed at a portion of abutment between the subject support bearing and the support projecting portion.

The term "drivably coupled" as used herein refers to a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction engagement element and a meshing-type engagement element. In the case where respective rotary elements of a differential gear mechanism such as a planetary gear mechanism are "drivably coupled" to each other, however, it is intended that three rotary elements provided in the differential gear mechanism are drivably coupled to each other via no other rotary element. The term "rotary electric machine" as used herein refers to any of a motor (electric motor), a generator (electric generator), and a motor generator that functions both as a motor and as a generator as necessary.

In the configuration described above, the inside gear mechanism meshes with the internal teeth provided on the inner circumferential surface of the cylindrical member, and is housed in the inside housing space formed on the radially inner side of the cylindrical member, and further, the cylindrical member is rotatably supported from the radially inner side by the two support bearings disposed on both sides in the axial direction across the inside gear mechanism. This enables the inside gear mechanism and the two support bearings to be disposed on the radially inner side of the cylindrical member so as to overlap the cylindrical member as seen in the radial direction. That is, the inside gear mechanism and the two support bearings can be disposed so as to be housed within the range of the axial length of the cylindrical member. This makes it possible to reduce the axial length of the space occupied by the cylindrical member, the inside gear mechanism, and the two support bearings, and to reduce the axial length of the entire vehicle drive device.

In a configuration in which the inside gear mechanism is housed in the inside housing space as described above, the inside housing space is formed as a closed space surrounded by the cylindrical member and the two support bearings disposed on both sides of the inside gear mechanism in the axial direction. This may make it difficult to supply a sufficient amount of lubricating oil to the inside gear mechanism housed in the inside housing space, which may make lubrication of the inside gear mechanism insufficient. In the characteristic configuration described above, however, an axial end surface of the cylindrical member and the facing wall surface face each other via a gap, the collected oil falling passage is configured to cause the oil collected by the oil collecting portion to be supplied to a portion of the facing wall surface located above the cylindrical member, and the communication oil passage which communicates between the gap and the inside housing space is formed at a portion of abutment between the subject support bearing and the support projecting portion. Therefore, the oil collected by the oil collecting portion is supplied into the inside housing space through the collected oil falling passage, the facing wall surface, the gap, and the communication oil passage. This makes it possible to supply a sufficient amount of lubricating oil to the inside gear mechanism housed in the inside housing space, thereby appropriately lubricating the inside gear mechanism. In this case, the oil collecting portion is configured to collect oil supplied by rotation of the power transfer mechanism, and disposed above the cylindrical member, and the collected oil falling passage is configured to cause the oil collected by the oil collecting portion to flow downward to be supplied to a predetermined position of the facing wall surface. Therefore, oil is supplied to the oil collecting portion with the power transfer mechanism rotating, and the oil collected by the oil collecting portion is caused by the gravitational force to fall down from the collected oil falling passage to be supplied into the inside housing space. That is, according to the characteristic configuration, the inside gear mechanism can be lubricated appropriately with the power transfer mechanism rotating even if a hydraulic pressure generation device such as an oil pump driven by the internal combustion engine is stopped, for example.

In the above aspect, the subject support bearing may be a roller bearing in which rolling elements are housed between an inner race and an outer race, and may include a restriction member provided in an end surface of the subject support bearing on the facing wall surface side in the axial direction to restrict entry of oil into a space between the inner race and the outer race.

With the configuration described above, it is possible to restrict entry of oil flowing on the facing wall surface side of the subject support bearing through the gap between the facing wall surface and the axial end surface of the cylindrical member into a space between the inner race and the outer race of the subject support bearing. This suppresses oil supplied from the collected oil falling passage from flowing into the subject support bearing, which allows oil to positively flow into the communication oil passage. This facilitates supplying an appropriate amount of lubricating oil to the inside gear mechanism housed in the inside housing space. This also reduces the drag resistance of oil against rotation of the rolling elements due to entry of oil into a space between the inner race and the outer race of the subject support bearing.

In the above aspect, a lower communication oil passage that communicates between the gap and the inside housing space may be formed at the portion of abutment between the subject support bearing and the support projecting portion and below the communication oil passage, separately from the communication oil passage.

With the configuration described above, oil accumulated inside the inside housing space can be discharged to the outside from the lower communication oil passage. Here, the lower communication oil passage is formed at a portion of abutment between the subject support bearing and the support projecting portion, and therefore positioned above the lowermost portion of the inner circumferential surface of the cylindrical member, which serves as the peripheral wall surface of the inside housing space. Therefore, the configuration permits oil to be accumulated in a region of the inside housing space located below the lower communication oil passage, and allows only oil reaching the height of the lower communication oil passage to be discharged. Thus, the configuration allows a predetermined amount of oil to be accumulated inside the inside housing space while discharging more than a necessary amount of oil. This facilitates supplying an appropriate amount of lubricating oil to the inside gear mechanism housed in the inside housing space.

In the above aspect, the cylindrical member may include a discharge oil passage that communicates between the inner circumferential surface and an outer circumferential surface; and an opening portion of the discharge oil passage on the inner circumferential surface side may be disposed on the opposite side of the internal teeth from the subject support bearing.

With the configuration described above, the discharge oil passage is configured to communicate between the inner circumferential surface and the outer circumferential surface of the cylindrical member. This facilitates reducing the amount of oil accumulated in the inside housing space. Thus, the resistance of oil against rotation of the cylindrical member and the inside gear mechanism can be reduced. With the configuration described above, in addition, oil supplied from the communication oil passage formed on the subject support bearing side of the internal teeth is discharged from the discharge oil passage, the opening portion of which on the inner circumferential surface side is disposed on the opposite side of the internal teeth from the communication oil passage. That is, oil supplied from the communication oil passage to the inside housing space is not discharged from the discharge oil passage before lubricating the inside gear mechanism which meshes with the internal teeth. Thus, according to the configuration, the inside gear mechanism can be lubricated more reliably.

In the above aspect, the support wall portion may include a pair of projecting streak portions that project from the facing wall surface to extend in a radial direction of the cylindrical member along the facing wall surface; the pair of projecting streak portions may be disposed to extend obliquely upward such that an interval in a circumferential direction between the pair of projecting streak portions becomes larger toward the radially outer side; and a lower end portion of the collected oil falling passage and the communication oil passage may be disposed between the pair of projecting streak portions in the circumferential direction.

With the configuration described above, oil supplied from the oil collecting portion via the collected oil falling passage is guided downward along the facing wall surface by the pair of projecting streak portions to the communication oil passage. Thus, according to the configuration, oil can be efficiently supplied to the communication oil passage.

DETAILED DESCRIPTION OF THE EMBODIMENTS

Figure 1:
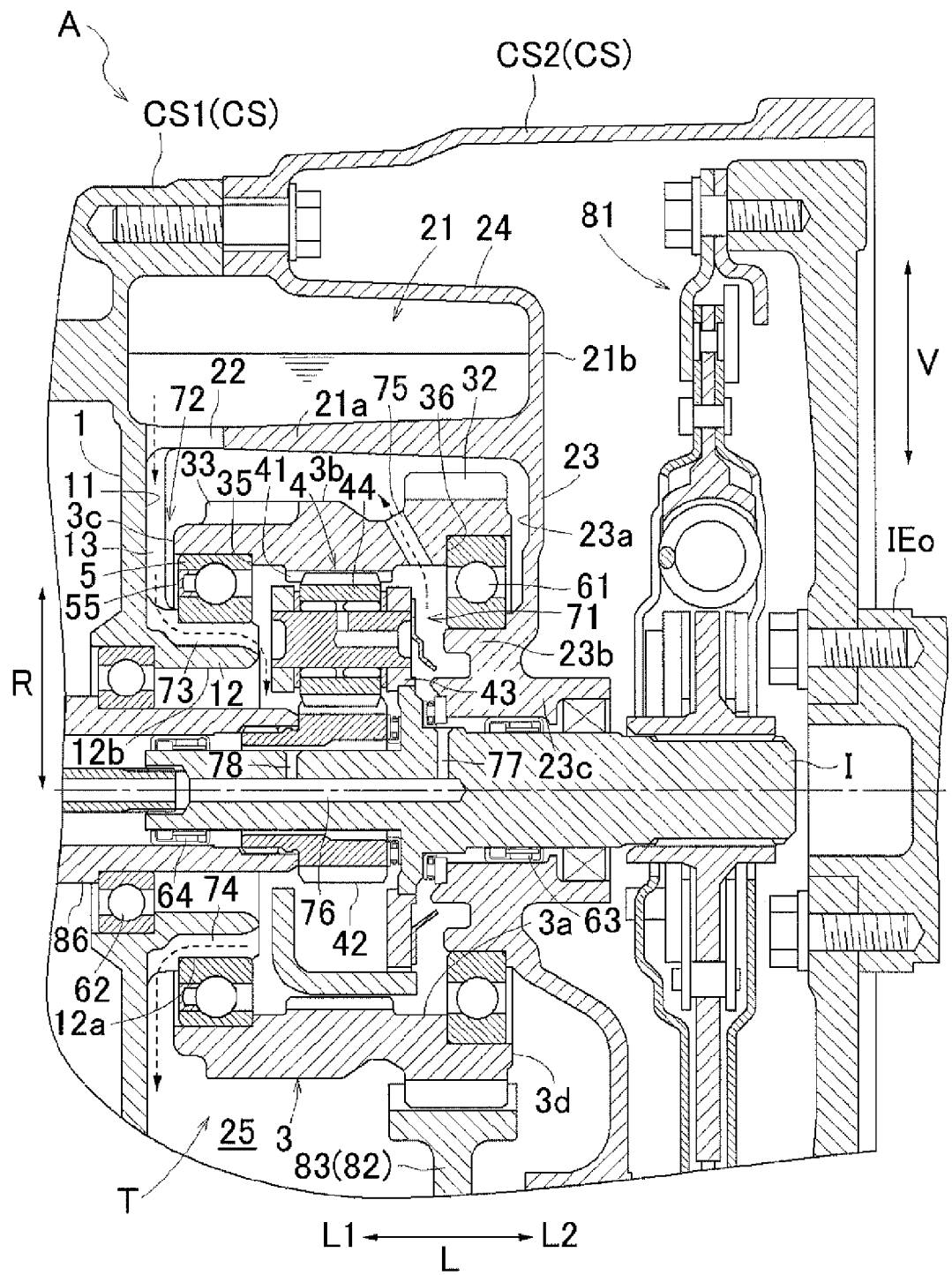
FIG. 1 is a sectional view of an essential portion of a vehicle drive device according to an embodiment of the present invention.

A vehicle drive device according to an embodiment of the present invention will be described with reference to the drawings. The vehicle drive device is a drive device for use for a hybrid vehicle including an internal combustion engine and at least one rotary electric machine as drive force sources for wheels. In the embodiment, a vehicle drive device A is formed as a drive device for a so-called two-motor split type hybrid vehicle including an internal combustion engine IE and two rotary electric machines MG1 and MG2 as drive force sources for wheels W. That is, the vehicle drive device A includes an input shaft I drivably coupled to the internal combustion engine IE, the first rotary electric machine MG1 and the second rotary electric machine MG2, an output shaft O drivably coupled to the wheels W, a power transfer mechanism T that drivably couples the input shaft I, the first rotary electric machine MG1 and the second rotary electric machine MG2, and the output shaft O, and a case CS that houses at least the power transfer mechanism T.

In the embodiment, the input shaft I corresponds to the input member according to the present invention, the output shaft O corresponds to the output member according to the present invention, and one or both of the first rotary electric machine MG1 and the second rotary electric machine MG2 correspond to the rotary electric machine according to the present invention. In the description below, unless otherwise noted, an "axial direction L", a "circumferential direction C", and a "radial direction R" are defined with reference to the axis of a cylindrical member 3 to be discussed later. The term "first axial direction L1" represents a direction from the cylindrical member 3 toward a first support wall portion 1 along the axial direction L (toward the left in FIG. 1), and the term "second axial direction L2" represents a direction from the cylindrical member 3 toward a second support wall portion 23 along the axial direction L (toward the right in FIG. 1). Unless otherwise noted, the term "radially inner side" represents the inner side in the radial direction R with reference to the axis of the cylindrical member 3, and the term "radially outer side" represents the outer side in the radial direction R with reference to the axis of the cylindrical member 3. The terms "above" and "below" are defined with reference to a vertical direction V with the vehicle drive device A mounted on a vehicle.

The power transfer mechanism T of the vehicle drive device A includes the cylindrical member 3, and a planetary gear mechanism 4 housed in an inside housing space 71 formed on the radially inner side of the cylindrical member 3. The cylindrical member 3 is rotatably supported from the radially inner side by two support bearings 5 and 61 disposed on both sides in the axial direction L across the planetary gear mechanism 4. Therefore, the inside housing space 71 is formed as a closed space surrounded by the cylindrical member 3 and the two support bearings 5 and 61. The vehicle drive device A according to the embodiment is characterized in including a configuration for supplying a sufficient amount of lubricating oil to the planetary gear mechanism 4 housed in the inside housing space 71. Specifically, the vehicle drive device A includes an oil collecting portion 21 configured to collect oil supplied by rotation of the power transfer mechanism T, and is configured to cause the oil in the oil collecting portion 21 to fall down from a collected oil falling passage 22 to be supplied into the inside housing space 71 via a first facing wall surface 11 of the first support wall portion 1, an axial end gap 72 which is a gap between an axial end surface of the cylindrical member 3 and the first facing wall surface 11, and a communication oil passage 73. The configuration of the vehicle drive device A according to the embodiment will be described in detail below.

1. Schematic Configuration of Entire Vehicle Drive Device

Figure 2:
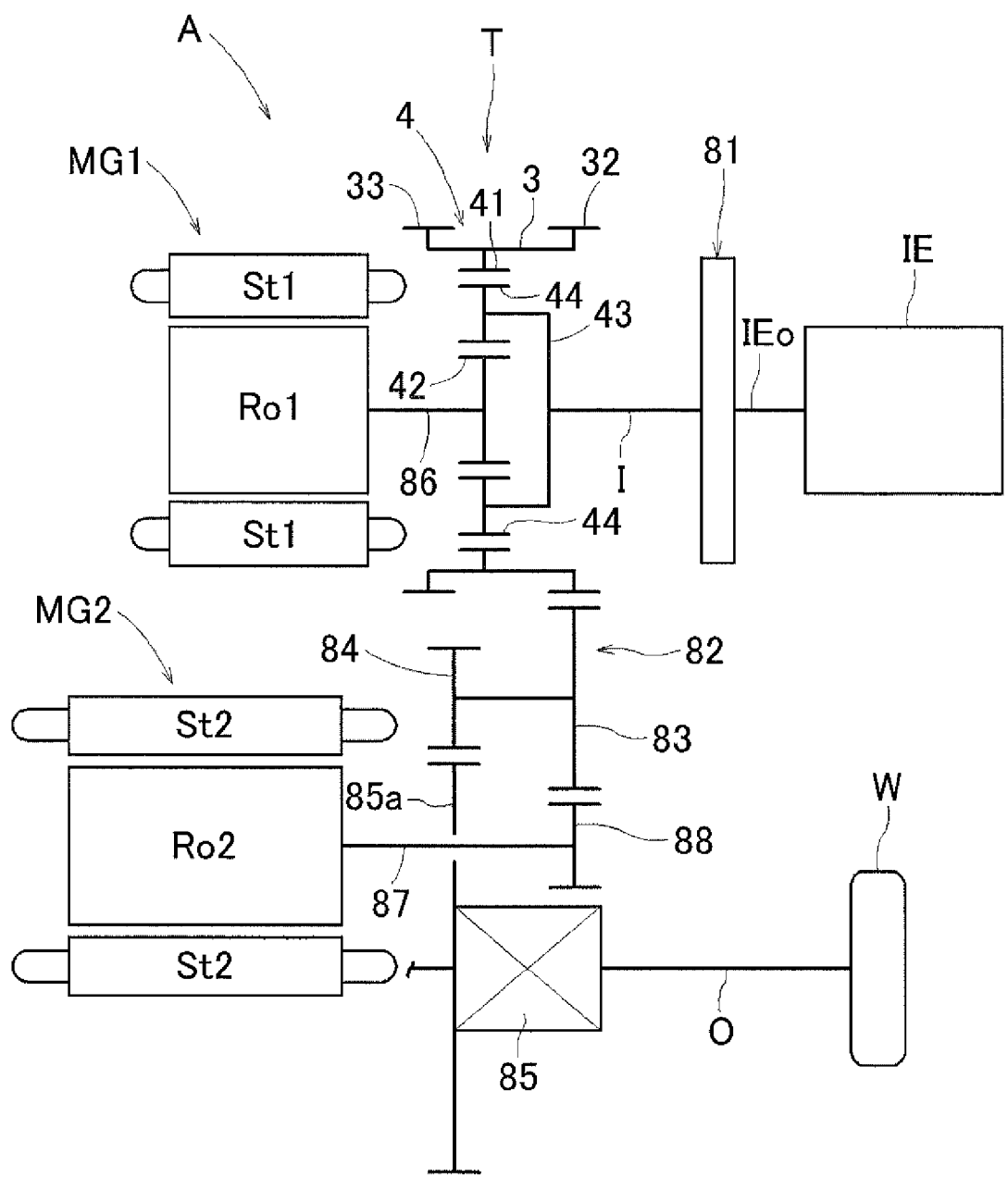
FIG. 2 is a skeleton diagram showing the overall configuration of the vehicle drive device according to the embodiment of the present invention.

First, the overall configuration of the vehicle drive device A according to the embodiment will be described with reference to the skeleton diagram shown in FIG. 2. As shown in FIG. 2, the vehicle drive device A is formed as a drive device for use for a hybrid vehicle including the internal combustion engine IE and the two rotary electric machines MG1 and MG2 as drive force sources for the wheels W. The vehicle drive device A includes the input shaft I, the first rotary electric machine MG1, the second rotary electric machine MG2, the output shaft O drivably coupled to the wheels W, the power transfer mechanism T, and the case CS. The power transfer mechanism T is a mechanism that drivably couples the input shaft I, the first rotary electric machine MG1, the second rotary electric machine MG2, and the output shaft O. In the embodiment, the power transfer mechanism T is formed to include the cylindrical member 3, the planetary gear mechanism 4, a counter gear mechanism 82, an output differential gear mechanism 85, a first rotary electric machine shaft 86, a second rotary electric machine shaft 87, and a second rotary electric machine output gear 88. In the embodiment, in addition, the case CS is configured to house the power transfer mechanism T, the first rotary electric machine MG1, and the second rotary electric machine MG2.

The input shaft I is drivably coupled to the internal combustion engine IE. Here, the internal combustion engine IE is a motor that outputs power through combustion of fuel. Examples of the internal combustion engine IE include spark-ignition engines such as a gasoline engine and compression-ignition engines such as a diesel engine. In the example, the input shaft I is drivably coupled to an internal combustion engine output shaft IEo such as a crankshaft of the internal combustion engine IE via a damper 81. A configuration in which the input shaft I is drivably coupled to the internal combustion engine output shaft IEo either via a clutch or the like in addition to the damper 81, or directly not via the damper 81 or a clutch or the like, is also suitable.

The first rotary electric machine MG1 includes a first stator St1 fixed to the case CS and a first rotor Ro1 supported on the radially inner side of the first stator St1 so as to be rotatable. The first rotor Ro1 is drivably coupled to a sun gear 42 of the planetary gear mechanism 4, which functions as a power distribution device, via the first rotary electric machine shaft 86 so as to rotate together with the sun gear 42. The first rotary electric machine MG1 can function as a motor (electric motor) that is supplied with electric power to produce power and as a generator (electric generator) that is supplied with power to produce electric power. Therefore, the first rotary electric machine MG1 is electrically connected to an electricity accumulation device (not shown). Various types of electricity accumulation devices known in the art such as a battery and a capacitor may be used as the electricity accumulation device. In the embodiment, the first rotary electric machine MG1 mainly functions as a generator that generates electric power using torque of the input shaft I (internal combustion engine IE) input via the planetary gear mechanism 4 to supply electric power for charging the electricity accumulation device or driving the second rotary electric machine MG2. It should be noted, however, that the first rotary electric machine MG1 occasionally functions as a motor that performs power running to produce a drive force when the vehicle is traveling at a high speed or when the internal combustion engine IE is started, for example.

The second rotary electric machine MG2 includes a second stator St2 fixed to the case CS and a second rotor Ro2 supported on the radially inner side of the second stator St2 so as to be rotatable. The second rotor Ro2 is drivably coupled to the second rotary electric machine output gear 88 via the second rotary electric machine shaft 87 so as to rotate together with the second rotary electric machine output gear 88. The second rotary electric machine MG2 can function as a motor (electric motor) that is supplied with electric power to produce a drive force and as a generator (electric generator) that is supplied with power to produce electric power. Therefore, the second rotary electric machine MG2 is also electrically connected to the electricity accumulation device (not shown). In the embodiment, the second rotary electric machine MG2 mainly functions as a motor that produces a drive force for driving the vehicle. It should be noted, however, that the second rotary electric machine MG2 occasionally functions as a generator that regenerates an inertial force of the vehicle into electrical energy when the vehicle is decelerated, for example.

In the embodiment, the planetary gear mechanism 4 is a single-pinion planetary gear mechanism disposed coaxially with the input shaft I. That is, the planetary gear mechanism 4 includes three rotary elements, namely a carrier 43 that supports a plurality of pinion gears 44, and the sun gear 42 and a ring gear 41 that each mesh with the pinion gears 44. The sun gear 42 is drivably coupled to the first rotary electric machine shaft 86, which is a rotary shaft of the first rotor Ro1 of the first rotary electric machine MG1, so as to rotate together with the first rotary electric machine shaft 86. The carrier 43 is drivably coupled to the input shaft I so as to rotate together with the input shaft I. The ring gear 41 is drivably coupled to the cylindrical member 3 so as to rotate together with the cylindrical member 3. The three rotary elements of the planetary gear mechanism 4 are the sun gear 42 (first rotary element), the carrier 43 (second rotary element), and the ring gear 41 (third rotary element) in the order of rotational speed. The term "order of rotational speed" may refer to either of an order from the high speed side to the low speed side and an order from the low speed side to the high speed side depending on the rotating state of the planetary gear mechanism 4. In either case, the order of the rotary elements is invariable. Here, the "order of rotational speed" is equivalent to the order of arrangement of the rotary elements of the planetary gear mechanism 4 in a velocity diagram (collinear diagram). The phrase "order of arrangement of the rotary elements in a velocity diagram (collinear diagram)" refers to the order in which axes corresponding to the rotary elements are arranged in the velocity diagram.

The planetary gear mechanism 4 functions as a power distribution device that distributes torque of the internal combustion engine IE transferred to the input shaft I to the first rotary electric machine MG1 and the cylindrical member 3. In the planetary gear mechanism 4, the input shaft I is drivably coupled to the carrier 43, which is at the middle in the order of rotational speed. In addition, the first rotor Ro1 of the first rotary electric machine MG1 is drivably coupled to the sun gear 42, which is on one side in the order of rotational speed, via the first rotary electric machine shaft 86. The ring gear 41, which is on the other side in the order of rotational speed, is drivably coupled to the cylindrical member 3 so as to rotate together with the cylindrical member 3. In the vehicle drive device A according to the embodiment, torque of the internal combustion engine IE in the positive direction is transferred to the carrier 43, which is at the middle in the order of rotational speed, via the input shaft I, and torque in the negative direction output from the first rotary electric machine MG1 is transferred to the sun gear 42, which is on one side in the order of rotational speed. Torque of the first rotary electric machine MG1 in the negative direction functions as a reaction force of torque of the internal combustion engine IE. This allows the planetary gear mechanism 4 to distribute part of torque of the internal combustion engine IE, which is transferred to the carrier 43 via the input shaft I, to the first rotary electric machine MG1, and to transfer torque, which has been attenuated with respect to torque of the internal combustion engine IE, to the cylindrical member 3 via the ring gear 41.

The cylindrical member 3 is a power transfer member formed in a cylindrical shape. In the embodiment, as also shown in FIG. 1, the cylindrical member 3 has a diameter larger than that of the planetary gear mechanism 4, and is provided to encircle the radially outer side of the planetary gear mechanism 4. Internal teeth are formed on an inner circumferential surface 3a of the cylindrical member 3, and the internal teeth serve as the ring gear 41 of the planetary gear mechanism 4. That is, in the embodiment, the ring gear 41 of the planetary gear mechanism 4 is formed integrally with the cylindrical member 3. The plurality of pinion gears 44 of the planetary gear mechanism 4 mesh with the ring gear 41 (internal teeth) provided on the inner circumferential surface 3a of the cylindrical member 3. The plurality of pinion gears 44, the carrier 43, and the sun gear 42 are housed in the inside housing space 71 formed on the radially inner side of the cylindrical member 3. Thus, in the embodiment, the pinion gears 44, the carrier 43, and the sun gear 42 of the planetary gear mechanism 4 correspond to the inside gear mechanism according to the present invention.

A counter drive gear 32 is provided on an outer circumferential surface 3b of the cylindrical member 3. That is, in the embodiment, the counter drive gear 32 which meshes with the counter gear mechanism 82 is formed integrally with the cylindrical member 3. This allows torque transferred to the cylindrical member 3 via the ring gear 41 of the planetary gear mechanism 4 to be output to the counter gear mechanism 82 on the wheels W side via the counter drive gear 32. In the embodiment, in addition, a parking gear 33 is also provided on the outer circumferential surface 3b of the cylindrical member 3. Here, the parking gear 33 is formed integrally with the cylindrical member 3 on the first axial direction L1 side of the counter drive gear 32. The parking gear 33 forms a part of a parking lock mechanism. That is, a lock member (not shown) engages with the parking gear 33 to prevent rotation of the wheels W and the power transfer mechanism T while the vehicle is stationary.

As shown in FIG. 2, the counter gear mechanism 82 reverses the rotational direction of the counter drive gear 32, and transfers torque transferred from the counter drive gear 32 to the output differential gear mechanism 85 on the wheels W side. The counter gear mechanism 82 includes a first counter gear 83, a second counter gear 84, and a counter shaft that couples the first counter gear 83 and the second counter gear 84 so as to rotate together with each other. The first counter gear 83 meshes with the counter drive gear 32. The first counter gear 83 also meshes with the second rotary electric machine output gear 88 at a circumferential position different from that for the counter drive gear 32. The second counter gear 84 meshes with a differential input gear 85a of the output differential gear mechanism 85. Thus, the counter gear mechanism 82 reverses the rotational direction of the counter drive gear 32 and the second rotary electric machine output gear 88, and transfers torque transferred to the counter drive gear 32 and torque of the second rotary electric machine MG2 to the output differential gear mechanism 85.

The output differential gear mechanism 85 includes the differential input gear 85a, and distributes torque transferred to the differential input gear 85a to the plurality of wheels W. In the example, the output differential gear mechanism 85 is formed as a differential gear mechanism that uses a plurality of bevel gears that mesh with each other, and splits torque transferred to the differential input gear 85a via the second counter gear 84 of the counter gear mechanism 82 to two output shafts O to transfer the split torque to the two left and right wheels W via the respective output shafts O. In this event, the output differential gear mechanism 85 transfers rotation of the second counter gear 84 to the wheels W while reversing the rotational direction of the second counter gear 84. This allows the vehicle drive device A to rotate the wheels W in the same direction as the rotational direction of the input shaft I (internal combustion engine IE), and to transfer torque in the same direction as that of the input shaft I (internal combustion engine IE) and the second rotary electric machine MG2 to the wheels W, when the vehicle is driven forward.

2. Specific Configuration of Essential Portion of Vehicle Drive Device

Next, a specific configuration of an essential portion of the vehicle drive device A according to the embodiment will be described with reference to the sectional view of the essential portion shown in FIG. 1. It should be noted, however, that the configuration for supplying oil to the planetary gear mechanism 4 will be described in detail later in "3. Structure for Supplying Oil to Planetary Gear Mechanism". As shown in FIG. 1, the vehicle drive device A includes the case CS which houses at least the power transfer mechanism T. In the embodiment, the case CS houses the power transfer mechanism T, the first rotary electric machine MG1, and the second rotary electric machine MG2, and further houses all of the input shaft I and a part of the output shaft O. In addition, the case CS includes a first case CS1 on the first axial direction L1 side, and a second case CS2 attached to the first case CS1 on the second axial direction L2 side. The first case CS1 and the second case CS2 are fastened to each other using fastening members such as bolts.

As shown in FIG. 1, the case CS includes the first support wall portion 1 and the second support wall portion 23 which are wall-like portions extending in the radial direction R. In the embodiment, the first case CS1 is provided with the first support wall portion 1, and the second case CS2 is provided with the second support wall portion 23. A power transfer mechanism housing chamber 25 that houses the cylindrical member 3, the planetary gear mechanism 4, the counter gear mechanism 82, the output differential gear mechanism 85, and the second rotary electric machine output gear 88 which form the power transfer mechanism T is formed between the first support wall portion 1 and the second support wall portion 23. In addition, a peripheral wall portion 24 is provided to surround the radially outer side of the power transfer mechanism housing chamber 25. In the embodiment, the first support wall portion 1 corresponds to the "support wall portion" according to the present invention.

The first support wall portion 1 is shaped to extend in the radial direction R and the circumferential direction C. The first support wall portion 1 includes the first facing wall surface 11 which faces a first axial direction end surface 3c of the cylindrical member 3, and a first support projecting portion 12 that projects from the first facing wall surface 11. The first facing wall surface 11 faces the first axial direction end surface 3c, which is an end surface of the cylindrical member 3 on the first axial direction L1 side, via the gap 72, and extends to a radially outer side of the cylindrical member 3. In the description of the embodiment, the gap between the first facing wall surface 11 and the first axial direction end surface 3c of the cylindrical member 3 is called an axial end gap 72. In the embodiment, the first axial direction end surface 3c of the cylindrical member 3 corresponds to the axial end surface according to the present invention, the first facing wall surface 11 corresponds to the facing wall surface according to the present invention, and the first support projecting portion 12 corresponds to the support projecting portion according to the present invention. The first support projecting portion 12 is formed on the radially inner side of the cylindrical member 3 to project from the first facing wall surface 11 toward the cylindrical member 3, that is, toward the second axial direction L2 side. Here, the first support projecting portion 12 is formed in the shape of a cylinder that is coaxial with the axis of the cylindrical member 3. The first support projecting portion 12 is formed integrally with a wall body portion forming the first facing wall surface 11. The first rotary electric machine shaft 86 passes through a through hole formed on the radially inner side of the first support projecting portion 12. The first rotary electric machine shaft 86 passes through the through hole of the first support projecting portion 12 so as to pass through the first support wall portion 1. The first rotary electric machine shaft 86 is coupled to the sun gear 42 of the planetary gear mechanism 4 in the power transfer mechanism housing chamber 25.

Figure 3:
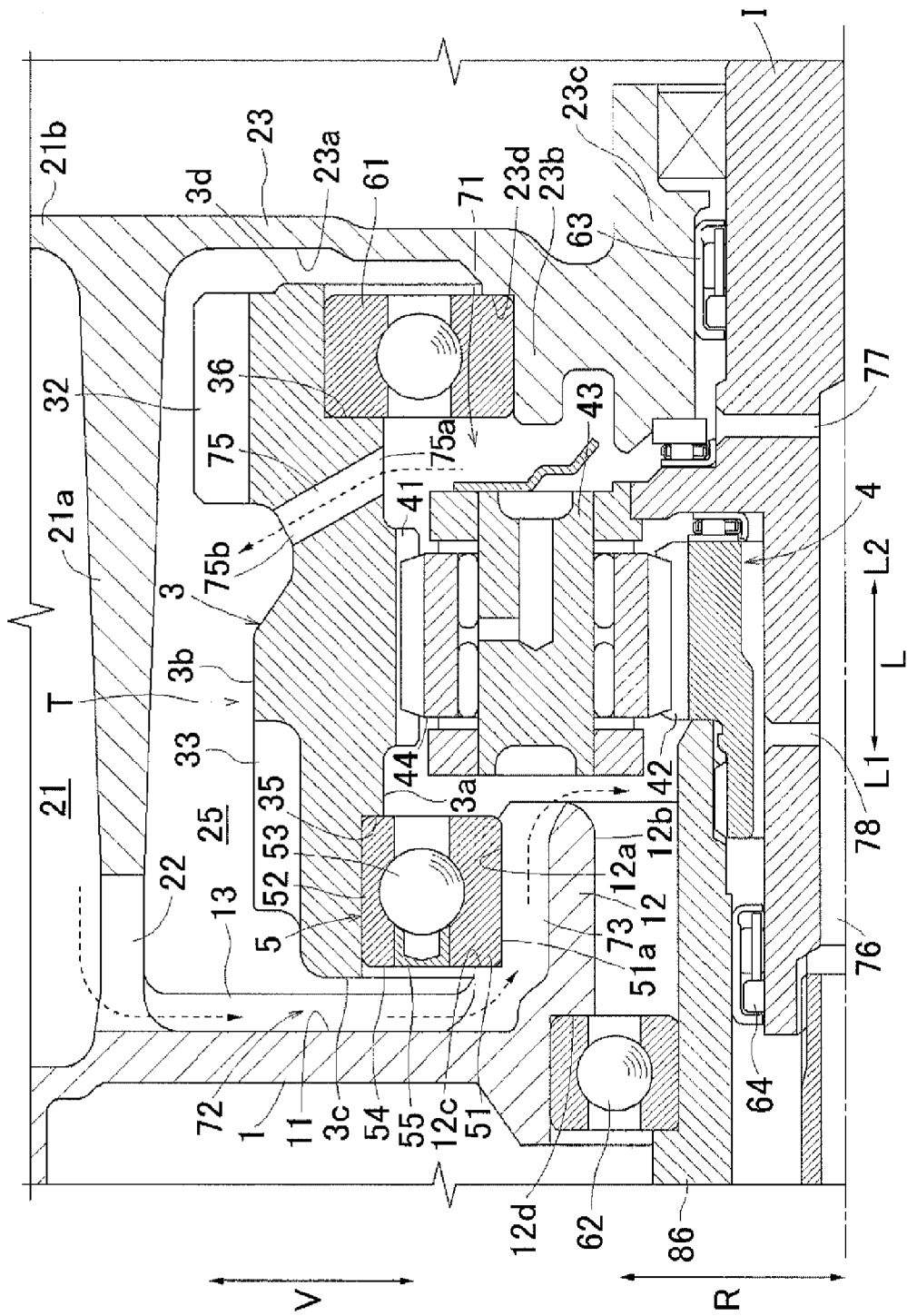
FIG. 3 is an enlarged view of an essential portion of FIG. 1.

As shown in FIG. 3, an inner circumferential stepped portion 12d is formed on an inner circumferential surface 12b of the first support projecting portion 12. A portion of the inner circumferential surface 12b on the first axial direction L1 side of the inner circumferential stepped portion 12d is defined as a large diameter portion, and a portion of the inner circumferential surface 12b on the second axial direction L2 side of the inner circumferential stepped portion 12d is defined as a small diameter portion with a diameter smaller than that of the large diameter portion. A first rotary electric machine bearing 62 is disposed in abutment with the large diameter portion and the inner circumferential stepped portion 12d of the inner circumferential surface 12b. The first rotary electric machine bearing 62 is a bearing that rotatably supports the first rotary electric machine shaft 86 from the radially outer side. The first rotary electric machine shaft 86 is supported so as to be rotatable with respect to the first support wall portion 1 via the first rotary electric machine bearing 62. Here, the first rotary electric machine bearing 62 is disposed at a position overlapping the wall body portion (first facing wall surface 11) of the first support wall portion 1 as seen in the radial direction R.

In addition, an outer circumferential stepped portion 12c is formed on an outer circumferential surface 12a of the first support projecting portion 12. A portion of the outer circumferential surface 12a on the first axial direction L1 side of the outer circumferential stepped portion 12c is defined as a large diameter portion, and a portion of the outer circumferential surface 12a on the second axial direction L2 side of the outer circumferential stepped portion 12c is defined as a small diameter portion with a diameter smaller than that of the large diameter portion. The first support bearing 5 is disposed in abutment with the small diameter portion and the outer circumferential stepped portion 12c of the outer circumferential surface 12a. The first support bearing 5 is a bearing that rotatably supports the cylindrical member 3 from the radially inner side. The first support projecting portion 12 abuts against the first support bearing 5 to support the first support bearing 5 at least from the radially inner side. In the embodiment, the outer circumferential surface 12a of the first support projecting portion 12 abuts against an inner circumferential surface 51a of the first support bearing 5, and the outer circumferential stepped portion 12c of the first support projecting portion 12 abuts against a part of a first axial direction end surface 54 of the first support bearing 5, to support the first support bearing 5 from the radially inner side and the first axial direction L1 side. Thus, the first support projecting portion 12 has the shape of a stepped cylinder formed integrally with an end portion of the wall body portion of the first support wall portion 1 on the radially inner side and having the stepped portions 12c and 12d formed on the outer circumferential surface 12a and the inner circumferential surface 12b, respectively.

Figure 4:
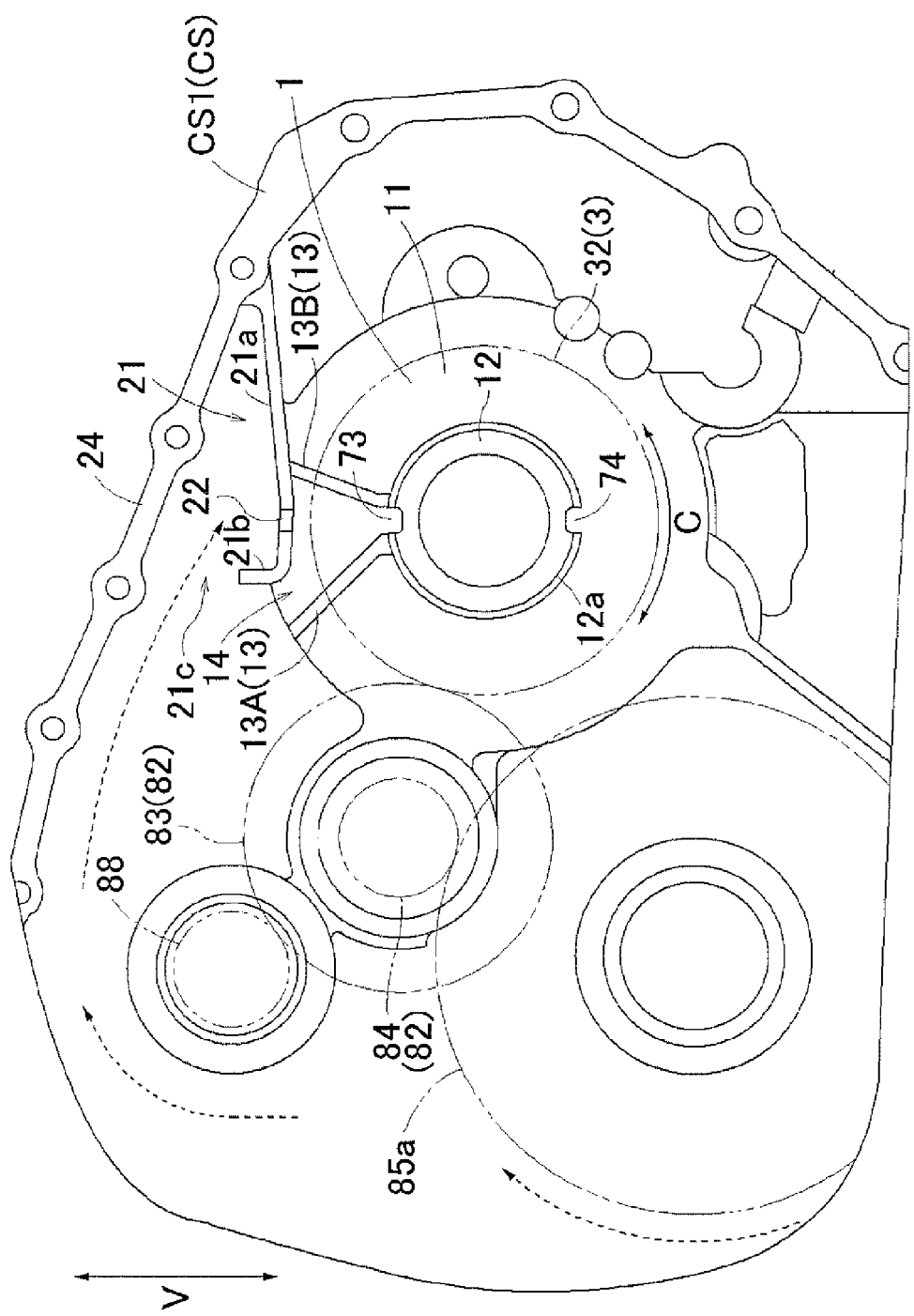
FIG. 4 is a view of a facing wall surface of the vehicle drive device according to the embodiment of the present invention as seen in the axial direction.

An upper communication oil passage 73 and a lower communication oil passage 74 (see FIG. 1) are formed in the outer circumferential surface 12a of the first support projecting portion 12. In addition, the first support wall portion 1 includes a pair of projecting streak portions 13 that project from the first facing wall surface 11 and that extend in the radial direction R along the first facing wall surface 11. In the embodiment, as shown in FIG. 4, a pair of a first projecting streak portion 13A and a second projecting streak portion 13B are formed on the first facing wall surface 11. The configuration of the two communication oil passages 73 and 74 and the pair of projecting streak portions 13A and 13B will be described in detail later.

As shown in FIGS. 1 and 3, the second support wall portion 23 is shaped to extend in the radial direction R and the circumferential direction C. The second support wall portion 23 includes a second facing wall surface 23a that faces a second axial direction end surface 3d of the cylindrical member 3, a second support projecting portion 23b that projects from the second facing wall surface 23a, and an inside cylindrical portion 23c provided on the radially inner side of the second support projecting portion 23b to extend in the axial direction L. The second facing wall surface 23a faces the second axial direction end surface 3d, which is an end surface of the cylindrical member 3 on the second axial direction L2 side, via a gap, and extends to the radially outer side of the cylindrical member 3. The second support projecting portion 23b is formed on the radially inner side of the cylindrical member 3 to project from the second facing wall surface 23a toward the cylindrical member 3, that is, toward the first axial direction L1 side. Here, the second support projecting portion 23b is formed in the shape of a cylinder that is coaxial with the axis of the cylindrical member 3, and formed integrally with a wall body portion forming the second facing wall surface 23a. The inside cylindrical portion 23c is disposed on the radially inner side of the second support projecting portion 23b, and formed in the shape of a cylinder that is coaxial with the second support projecting portion 23b. The input shaft I passes through a through hole provided on the radially inner side of the inside cylindrical portion 23c. The input shaft I passes through the through hole of the inside cylindrical portion 23c so as to pass through the second support wall portion 23. The input shaft I is coupled to the carrier 43 of the planetary gear mechanism 4 in the power transfer mechanism housing chamber 25. A first input bearing 63 is disposed between the input shaft I and the inner circumferential surface of the inside cylindrical portion 23c. This allows the input shaft I to be supported from the radially outer side so as to be rotatable with respect to the second support wall portion 23 via the first input bearing 63.

In addition, as in the first support projecting portion 12, an outer circumferential stepped portion 23d is formed on the outer circumferential surface of the second support projecting portion 23b. A portion of the outer circumferential surface of the second support projecting portion 23b on the second axial direction L2 side of the outer circumferential stepped portion 23d is defined as a large diameter portion, and a portion of the outer circumferential surface of the second support projecting portion 23b on the first axial direction L1 side of the outer circumferential stepped portion 23d is defined as a small diameter portion with a diameter smaller than that of the large diameter portion. The second support bearing 61 is disposed in abutment with the small diameter portion and the outer circumferential stepped portion 23d of the outer circumferential surface of the second support projecting portion 23b. The second support bearing 61 is a bearing that rotatably supports the cylindrical member 3 from the radially inner side together with the first support bearing 5 discussed above. The second support projecting portion 23b abuts against the second support bearing 61 to support the second support bearing 61 at least from the radially inner side. In the embodiment, the outer circumferential surface of the second support projecting portion 23b abuts against the inner circumferential surface of the second support bearing 61, and the outer circumferential stepped portion 23d of the second support projecting portion 23b abuts against a part of an end surface of the second support bearing 61 on the second axial direction L2 side, to support the second support bearing 61 from the radially inner side and the second axial direction L2 side. Thus, the second support projecting portion 23b has the shape of a stepped cylinder formed integrally with the wall body portion of the second support wall portion 23 and having the outer circumferential stepped portion 23d formed on the outer circumferential surface.

The input shaft I is a shaft that allows torque of the internal combustion engine IE to be input to the vehicle drive device A. As shown in FIGS. 1 and 3, the input shaft I is coupled to the internal combustion engine IE at an end portion of the input shaft I on the second axial direction L2 side. In addition, the input shaft I has a flange portion provided at the middle portion of the input shaft I in the axial direction L. The flange portion extends in the radial direction R through a space in the axial direction L between an end portion of the sun gear 42 of the planetary gear mechanism 4 on the second axial direction L2 side and the second support wall portion 23, and is coupled to the carrier 43 of the planetary gear mechanism 4. The input shaft I is disposed to pass through the second support wall portion 23 of the case CS, and coupled to the internal combustion engine output shaft IEo of the internal combustion engine IE via the damper 81 at a location on the second axial direction L2 side of the second support wall portion 23 so as to rotate together with the internal combustion engine output shaft IEo. The damper 81 is a device that transfers rotation of the internal combustion engine output shaft IEo to the input shaft I while attenuating torsional vibration of the internal combustion engine output shaft IEo. Various dampers known in the art may be used as the damper 81. In addition, the input shaft I is supported by the inside cylindrical portion 23c of the second support wall portion 23 so as to be rotatable via the first input bearing 63. In the embodiment, in addition, the first rotary electric machine shaft 86 of the first rotary electric machine MG1 is formed in the shape of a cylinder having a through hole provided on the radially inner side to extend in the axial direction. An end portion of the input shaft I on the first axial direction L1 side is inserted into the through hole of the first rotary electric machine shaft 86. An end portion of the input shaft I on the first axial direction L1 side is supported by the first rotary electric machine shaft 86 so as to be rotatable via a second input bearing 64. The first rotary electric machine shaft 86 is a shaft that drivably couples the first rotor Ro1 of the first rotary electric machine MG1 and the sun gear 42 of the planetary gear mechanism 4 to each other. As shown in FIGS. 1 and 3, an end portion of the first rotary electric machine shaft 86 on the second axial direction L2 side is coupled to the sun gear 42. As described above, the first rotary electric machine shaft 86 is supported by the first support projecting portion 12 of the first support wall portion 1 from the radially outer side so as to be rotatable via the first rotary electric machine bearing 62.

In addition, an axial oil passage 76 and two radial oil passages, namely a first radial oil passage 77 and a second radial oil passage 78, are formed in the input shaft I. The axial oil passage 76 is an oil passage formed inside the input shaft I to extend in the axial direction L, and communicates with the discharge port of an oil pump (not shown). In addition, the first radial oil passage 77 and the second radial oil passage 78 are provided to extend in the radial direction of the input shaft I, and each communicate with the axial oil passage 76 at one end and open in the outer circumferential surface of the input shaft I at the other end. In the embodiment, the first radial oil passage 77 is disposed so as to open toward a region between the carrier 43 of the planetary gear mechanism 4 and the inside cylindrical portion 23c of the second support wall portion 23. Meanwhile, the second radial oil passage 78 is disposed so as to open toward the vicinity of the inner circumferential surface of the sun gear 42 of the planetary gear mechanism 4. Thus, oil discharged from the oil pump passes through the axial oil passage 76 and the first radial oil passage 77 or the second radial oil passage 78 to be supplied to various portions of the planetary gear mechanism 4 housed in the inside housing space 71. Here, in the embodiment, the oil pump is driven by rotation of the input shaft I (internal combustion engine IE). Thus, during operation of the internal combustion engine IE and with the input shaft I rotating, oil discharged from the oil pump is supplied to the inside housing space 71. With the internal combustion engine IE stopped, on the other hand, rotation of the input shaft I is also stopped, and therefore no oil is supplied from the oil pump. Thus, the vehicle drive device A includes an oil supply structure for collecting oil thrown up by rotation of rotary members such as gears forming the power transfer mechanism T in the oil collecting portion 21 to supply the oil into the inside housing space 71 as discussed later. This allows the vehicle drive device A to appropriately lubricate the planetary gear mechanism 4 even with the internal combustion engine IE stopped and the power transfer mechanism T rotating such as in a so-called EV travel (electric travel) mode in which the vehicle travels with the wheels W driven by a drive force of the rotary electric machines MG1 and MG2 or when the vehicle is towed.

The cylindrical member 3 is a power transfer member formed in a cylindrical shape, and is disposed on the radially outer side of the sun gear 42, the carrier 43, and the pinion gears 44 of the planetary gear mechanism 4 so as to surround the sun gear 42, the carrier 43, and the pinion gears 44. The ring gear 41 of the planetary gear mechanism 4 is formed integrally with the cylindrical member 3 on the inner circumferential surface 3a of the cylindrical member 3. In the embodiment, the ring gear 41 is formed at the middle portion of the cylindrical member 3 in the axial direction L. In addition, the inner circumferential surface 3a of the cylindrical member 3 has a first stepped portion 35 and a second stepped portion 36 that is provided on the second axial direction L2 side of the first stepped portion 35. The inner circumferential surface 3a of the cylindrical member 3 is configured such that the inside diameter of the inner circumferential surface 3a is varied at the two stepped portions 35 and 36. A portion of the inner circumferential surface 3a interposed between the two stepped portions 35 and 36 in the axial direction L is defined as a small diameter portion, and portions of the inner circumferential surface 3a located on the outer side of the two stepped portions 35 and 36 in the axial direction L are defined as large diameter portions each having a diameter larger than that of the small diameter portion. The ring gear 41 is formed on the small diameter portion of the inner circumferential surface 3a. With the pinion gears 44 disposed so as to mesh with the ring gear 41, the planetary gear mechanism 4 is disposed on the radially inner side of the cylindrical member 3 and at a position at which the entire planetary gear mechanism 4 overlaps the cylindrical member 3 as seen in the radial direction R. This allows the planetary gear mechanism 4 to be housed in the inside housing space 71 formed on the radially inner side of the cylindrical member 3.

The cylindrical member 3 is supported at two locations in the axial direction L so as to be rotatable with respect to the case CS. In the embodiment, the cylindrical member 3 is rotatably supported from the radially inner side by the two support bearings, namely the first support bearing 5 and the second support bearing 61, disposed on both sides in the axial direction L across the planetary gear mechanism 4. More specifically, the cylindrical member 3 is rotatably supported on the first support projecting portion 12 of the first support wall portion 1 from the radially inner side via the first support bearing 5, which is disposed between the large diameter portion of the inner circumferential surface 3a on the first axial direction L1 side and the outer circumferential surface 12a of the first support projecting portion 12, at an end portion of the cylindrical member 3 on the first axial direction L1 side. In the embodiment, the outer circumferential surface of the first support bearing 5 abuts against the large diameter portion of the inner circumferential surface 3a on the first axial direction L1 side, and a part of an end surface of the first support bearing 5 on the second axial direction L2 side abuts against the first stepped portion 35 of the inner circumferential surface 3a, so that the first support bearing 5 supports the cylindrical member 3 from the radially inner side and the first axial direction L1 side. In addition, the cylindrical member 3 is rotatably supported on the second support projecting portion 23b of the second support wall portion 23 from the radially inner side via the second support bearing 61, which is disposed between the large diameter portion of the inner circumferential surface 3a on the second axial direction L2 side and the outer circumferential surface of the second support projecting portion 23b, at an end portion of the cylindrical member 3 on the second axial direction L2 side. In the embodiment, the outer circumferential surface of the second support bearing 61 abuts against the large diameter portion of the inner circumferential surface 3a on the second axial direction L2 side, and a part of an end surface of the second support bearing 61 on the first axial direction L1 side abuts against the second stepped portion 36 of the inner circumferential surface 3a, so that the second support bearing 61 supports the cylindrical member 3 from the radially inner side and the second axial direction L2 side. In this way, the cylindrical member 3 is rotatably supported on the first support projecting portion 12 of the first support wall portion 1 of the case CS and the second support projecting portion 23b of the second support wall portion 23 from the radially inner side via the two support bearings 5 and 61, respectively. Consequently, the inside housing space 71 housing the planetary gear mechanism 4 is formed as a closed space surrounded by the cylindrical member 3 and the two support bearings 5 and 61 disposed on both sides of the planetary gear mechanism 4 in the axial direction L. More specifically, the inside housing space 71 is surrounded by the inner circumferential surface 3a of the cylindrical member 3, the two support bearings 5 and 61 disposed at both end portions of the cylindrical member 3 in the axial direction L, the first support projecting portion 12 and the second support projecting portion 23b, the inside cylindrical portion 23c, the input shaft I, the first rotary electric machine shaft 86, the first rotary electric machine bearing 62, the two input bearings 63 and 64, and so forth. Thus, the inside housing space 71 is formed as a surrounded, if not completely tightly sealed, closed space.

As shown in FIG. 3, the first support bearing 5 is a roller bearing, and includes an inner race 51, an outer race 52, and rolling elements 53 housed between the inner race 51 and the outer race 52. Hence, the inner circumferential surface 51a of the inner race 51 serves as the inner circumferential surface of the first support bearing 5. In the illustrated example, the rolling elements 53 are spherical. However, it is also suitable that the rolling elements 53 are circular columns. In the embodiment, in addition, the first support bearing 5 includes a restriction member 55 provided in the first axial direction end surface 54, which is an end surface of the first support bearing 5 on the first facing wall surface 11 side in the axial direction L (on the first axial direction L1 side), to restrict entry of oil into a space between the inner race 51 and the outer race 52. The restriction member 55 is an annular member formed by shaping a member having the same width as the gap between the inner race 51 and the outer race 52 in the first axial direction end surface 54 of the first support bearing 5 into an annular shape, and is configured to tightly seal the gap between the inner race 51 and the outer race 52 in the first axial direction end surface 54 of the first support bearing 5. Provision of the restriction member 55 can restrict entry of oil flowing along the first facing wall surface 11 into a space between the inner race 51 and the outer race 52 of the first support bearing 5. This suppresses oil flowing along the first facing wall surface 11 from flowing into the first support bearing 5, which allows oil to positively flow into the upper communication oil passage 73. This facilitates supplying an appropriate amount of oil to the planetary gear mechanism 4 housed in the inside housing space 71. In addition, entry of oil into a space between the inner race 51 and the outer race 52 of the first support bearing 5 is restricted to allow a reduction in drag resistance of oil against rotation of the rolling elements of the first support bearing 5. In the embodiment, the first support bearing 5 corresponds to the "subject support bearing" according to the present invention. In the embodiment, in addition, the second support bearing 61 is also a roller bearing in which rolling elements are housed between an inner race and an outer race, as with the first support bearing 5.

The first support bearing 5 is disposed at a position at which it is retracted toward the center in the axial direction L (toward the second axial direction L2 side) with respect to the first axial direction end surface 3c, which is an end surface of the cylindrical member 3 on the first axial direction L1 side. Similarly, the second support bearing 61 is disposed at a position at which it is retracted toward the center in the axial direction L (toward the first axial direction L1 side) with respect to the second axial direction end surface 3d, which is an end surface of the cylindrical member 3 on the second axial direction L2 side. The first axial direction end surface 3c of the cylindrical member 3 is disposed so as to face the first facing wall surface 11 via the axial end gap 72. The axial end gap 72 is larger than the projection height of both the pair of projecting streak portions 13A and 13B, which are provided on the first support wall portion 1, from the first facing wall surface 11. In the embodiment, the axial end gap 72 is set so as to secure a minimum necessary gap between the first axial direction end surface 3c of the cylindrical member 3 and the pair of projecting streak portions 13A and 13B in order that the first axial direction end surface 3c contacts none of the pair of projecting streak portions 13A and 13B. Similarly, the second axial direction end surface 3d of the cylindrical member 3 is disposed so as to face the second facing wall surface 23a of the second support wall portion 23 via a gap.

As shown in FIGS. 1 and 3, the counter drive gear 32 and the parking gear 33 are formed on the outer circumferential surface 3b of the cylindrical member 3. Both the counter drive gear 32 and the parking gear 33 are formed integrally with the cylindrical member 3 on the outer circumferential surface 3b of the cylindrical member 3. In the embodiment, the counter drive gear 32 is formed at an end portion of the cylindrical member 3 on the second axial direction L2 side. The counter drive gear 32 meshes with the first counter gear 83 of the counter gear mechanism 82. In addition, the counter drive gear 32 is disposed so as to overlap the second support bearing 61, which is disposed on the radially inner side of an end portion of the cylindrical member 3 on the second axial direction L2 side, as seen in the radial direction R. This enables a reduction in length in the axial direction L of a space for arrangement of the counter drive gear 32 and the second support bearing 61, compared to a configuration in which the counter drive gear 32 and the second support bearing 61 are disposed side by side in the axial direction L. On the other hand, the parking gear 33 is formed at an end portion of the cylindrical member 3 on the first axial direction L1 side. The parking gear 33 is disposed so as to overlap the first support bearing 5, which is disposed on the radially inner side of an end portion of the cylindrical member 3 on the first axial direction L1 side, as seen in the radial direction R. This enables a reduction in length in the axial direction L of a space for arrangement of the parking gear 33 and the first support bearing 5 compared to a configuration in which the parking gear 33 and the first support bearing 5 are disposed side by side in the axial direction L.

3. Structure for Supplying Oil to Planetary Gear Mechanism

Next, the structure for supplying oil to the planetary gear mechanism 4 in the vehicle drive device A according to the embodiment will be described. As described above, the inside housing space 71 housing the planetary gear mechanism 4 is formed as a closed space surrounded by the cylindrical member 3 and the two support bearings 5 and 61. Thus, the vehicle drive device A is characterized in including a structure for supplying a sufficient amount of oil to the planetary gear mechanism 4 housed in the inside housing space 71. The oil supply structure will be described in detail below.

As shown in FIGS. 1, 3, and 4, the oil collecting portion 21 and the collected oil falling passage 22 are provided inside the case CS. The oil collecting portion 21 is disposed above the cylindrical member 3, and configured to collect oil supplied by rotation of the power transfer mechanism T. In the description of the embodiment, the location above the cylindrical member 3 is a region above the outer circumferential surface 3*b* of the cylindrical member 3 in the vertical direction V, specifically a region on the outer side with respect to the outer circumferential surface 3*b* of the cylindrical member 3 in the radial direction R and above a horizontal plane passing through the axis of the cylindrical member 3. The oil collecting portion 21 is disposed in such a region above the cylindrical member 3. Here, the oil collecting portion 21 is disposed above the uppermost portion of the cylindrical member 3. In the embodiment, the oil collecting portion 21 is formed as an oil catch tank that receives and collects oil thrown up by rotation of rotary members such as gears forming the power transfer mechanism T. Specifically, as indicated by the broken arrows in FIG. 4, oil accumulated in the lower portion of the case CS is thrown up by rotation of the differential input gear 85*a*, the second rotary electric machine output gear 88, and so forth, and flows along the inner surface of the peripheral wall portion 24 of the case CS to be supplied to the oil collecting portion 21. The oil collecting portion 21 is shaped to be able to receive and collect such oil. Therefore, in the embodiment, the oil collecting portion 21 includes a bottom portion 21*a* that covers the lower side of an oil reserving space which is a space for reserving oil, a sidewall portion 21*b* that covers the lateral periphery of the oil reserving space, and an opening portion 21*c* that introduces oil into the oil reserving space. In addition, the upper side of the oil reserving space is covered by the peripheral wall portion 24 of the case CS. Here, the opening portion 21*c* is formed to contact the inner surface of the peripheral wall portion 24 of the case CS, and to open toward the side (toward the left side in FIG. 4) on which the differential input gear 85*a*, the counter gear mechanism 82, and the second rotary electric machine output gear 88 are disposed. This allows the oil thrown up by rotation of the differential input gear 85*a*, the second rotary electric machine output gear 88, and so forth and flowing down along the inner surface of the peripheral wall portion 24 of the case CS to be appropriately supplied to the oil reserving space. The oil introduced from the opening portion 21*c* is received by the bottom portion 21*a* and the sidewall portion 21*b* to be reserved in the oil reserving space surrounded by the bottom portion 21*a* and the sidewall portion 21*b*.

As shown in FIGS. 1, 3, and 4, the collected oil falling passage 22 is configured to cause oil collected by the oil collecting portion 21 to flow downward to be supplied to the first facing wall surface 11. The collected oil falling passage 22 is formed by a hole, a groove, or the like formed in a wall or a wall surface of the case CS, or by a tubular member or a gutter-like member disposed in the case CS. In the embodiment, the collected oil falling passage 22 is formed by a through hole provided to pass through the bottom portion 21*a* of the oil collecting portion 21 in the up-down direction. The thus configured collected oil falling passage 22 allows oil in the oil collecting portion 21 to flow downward utilizing the gravitational force to be supplied to the first facing wall surface 11. Here, the collected oil falling passage 22 is configured to supply oil to a portion of the first facing wall surface 11 located above the cylindrical member 3. Therefore, the lower end portion of the collected oil falling passage 22, at which oil is supplied to the first facing wall surface 11, is disposed above the cylindrical member 3 and in the vicinity of the first facing wall surface 11. In the embodiment, as shown in FIGS. 1 and 3, the lower end opening portion of the through hole serving as the lower end portion of the collected oil falling passage 22 is partially in contact with a portion of the first facing wall surface 11 located above the cylindrical member 3. This allows most of the oil flowing down from the lower end portion of the collected oil falling passage 22 to be supplied downward along the first facing wall surface 11. In the example, the entirety of the collected oil falling passage 22 in the radial direction R is formed along the first facing wall surface 11 so that the lower end portion of the collected oil falling passage 22 is disposed in contact with the first facing wall surface 11. In the embodiment, in addition, as shown in FIG. 4, the lower end portion of the collected oil falling passage 22 is disposed vertically above the upper communication oil passage 73. This allows oil falling down from the lower end portion of the collected oil falling passage 22 to reach the upper communication oil passage 73 through the axial end gap 72 by just flowing downward along the first facing wall surface 11 in the vertical direction V under the gravitational force. It should be noted, however, that the position of the lower end portion of the collected oil falling passage 22 is not limited thereto, and the lower end portion of the collected oil falling passage 22 may be disposed between the pair of projecting streak portions 13A and 13B in a direction parallel to the first facing wall surface 11. This is because such an arrangement allows oil flowing out of the lower end portion of the collected oil falling passage 22 to be appropriately guided to the upper communication oil passage 73 by the pair of projecting streak portions 13A and 13B.

As shown in FIG. 4, the first support wall portion 11 is provided with the first projecting streak portion 13A and the second projecting streak portion 13B. The first projecting streak portion 13A and the second projecting streak portion 13B are a pair of projecting streak portions 13 that project from the first facing wall surface 11 to extend in the radial direction R along the first facing wall surface 11. The pair of projecting streak portions 13A and 13B are disposed to extend obliquely upward such that the interval in the circumferential direction C between the pair of projecting streak portions 13A and 13B becomes larger toward the radially outer side. In the embodiment, each of the projecting streak portions 13A and 13B is a straight projecting streak that extends in the radial direction R except for its upper end portion and lower end portion, and that is constant in projection height from the first facing wall surface 11 and in width in the circumferential direction C except for its upper end portion and lower end portion. A cross section of each of the projecting streak portions 13A and 13B in the direction orthogonal to a direction in which each of the projecting streak portions 13A and 13B extends may be semi-circular, U-shaped, or rectangular, for example. In the embodiment, the first projecting streak portion 13A and the second projecting streak portion 13B are the same as each other in projection height from the first facing wall surface 11, width in the circumferential direction C, and cross-sectional shape.

The lower end portion of the collected oil falling passage 22 and the upper communication oil passage 73 are disposed between the pair of projecting streak portions 13A and 13B in the circumferential direction C. Consequently, the pair of projecting streak portions 13A and 13B can guide most of the oil flowing out of the lower end portion of the collected oil falling passage 22 so as to reach the upper communication oil passage 73 by suppressing the effect of the inertial force of the vehicle and rotation of the cylindrical member 3 during travel. Hence, oil from the oil collecting portion 21 can be efficiently supplied to the upper communication oil passage 73. In the embodiment, the upper communication oil passage 73 is disposed between the first projecting streak portion 13A and the second projecting streak portion 13B so as to be adjacent to both the respective lower end portions of the first projecting streak portion 13A and the second projecting streak portion 13B without a gap. In other words, the first projecting streak portion 13A and the second projecting streak portion 13B are disposed to extend obliquely upward from both sides adjacent to the upper communication oil passage 73. This allows most of the oil guided by the pair of projecting streak portions 13A and 13B to flow into the upper communication oil passage 73. On the other hand, the lower end portion of the collected oil falling passage 22 is disposed between the respective upper end portions of the first projecting streak portion 13A and the second projecting streak portion 13B. Although the lower end portion of the collected oil falling passage 22 is positioned vertically above the upper communication oil passage 73 in the example shown in FIG. 4, the lower end portion of the collected oil falling passage 22 is not positioned at the center portion between the respective upper end portions of the first projecting streak portion 13A and the second projecting streak portion 13B, but positioned on the second projecting streak portion 13B side of the center portion. This is attributable to the fact that the inclination angle of the first projecting streak portion 13A with respect to the vertical direction V is set to be larger than that of the second projecting streak portion 13B. The upper end portion of the first projecting streak portion 13A is disposed with a gap between the oil collecting portion 21 and the upper end portion of the first projecting streak portion 13A. More specifically, the upper end portion of the first projecting streak portion 13A is disposed with a gap between: the bottom portion 21a and the sidewall portion 21b of the oil collecting portion 21; and the upper end portion of the first projecting streak portion 13A. Such a gap forms a projecting streak opening portion 14 that opens obliquely upward. The projecting streak opening portion 14 functions as an opening portion that introduces oil into a region between the pair of projecting streak portions 13A and 13B. That is, oil overflowing from the oil collecting portion 21 and oil thrown up by the differential input gear 85a, the second rotary electric machine output gear 88, and so forth but not entering the opening portion 21c of the oil collecting portion 21 enters the projecting streak opening portion 14, and is guided by the pair of projecting streak portions 13A and 13B to flow into the upper communication oil passage 73. This enables oil thrown up by the differential input gear 85a, the second rotary electric machine output gear 88, and so forth to be efficiently supplied to the upper communication oil passage 73.

As shown in FIGS. 1 and 3, the upper communication oil passage 73 is formed at a portion of abutment between the first support bearing 5 and the first support projecting portion 12 so as to communicate between the axial end gap 72 and the inside housing space 71. Here, the portion of abutment between the first support bearing 5 and the first support projecting portion 12 is a location at which the first support bearing 5 and the first support projecting portion 12 abut against each other, and specifically a region in which the outer circumferential surface 12a of the first support projecting portion 12 and the inner circumferential surface 51a of the first support bearing 5 abut against each other. In the embodiment, the upper communication oil passage 73 is a recessed groove-like portion formed in the outer circumferential surface 12a of the first support projecting portion 12 to extend in the axial direction L. In this case, the upper communication oil passage 73 is formed continuously from a position on the first axial direction L1 side of the first support bearing 5 to a position on the second axial direction L2 side of the first support bearing 5 in order to communicate between both sides of the first support bearing 5 in the axial direction L. This allows the upper communication oil passage 73 to communicate with the axial end gap 72 via a gap between the first axial direction end surface 54 of the first support bearing 5 and the first facing wall surface 11 on the first axial direction L1 side, and to communicate with the inside housing space 71 on the second axial direction L2 side. That is, the upper communication oil passage 73 is formed so as to communicate between the axial end gap 72 and the inside housing space 71. In the example, in addition, as shown in FIG. 4, the upper communication oil passage 73 is formed like a U-shaped groove in cross section in the direction orthogonal to the direction in which the upper communication oil passage 73 extends. Besides, it is also suitable that the cross-sectional shape of the upper communication oil passage 73 is semi-circular or rectangular, for example. It is suitable that the upper communication oil passage 73 is disposed above a horizontal plane including the axis of the first support projecting portion 12 at the portion of abutment between the first support bearing 5 and the first support projecting portion 12, and more preferably disposed within the range of 45° on both sides in the circumferential direction C with reference to a plane including the axis of the first support projecting portion 12 and extending vertically upward. In the embodiment, the upper communication oil passage 73 is disposed in the uppermost portion of the first support projecting portion 12 that is a position vertically above the axis of the first support projecting portion 12.

The lower communication oil passage 74 is basically configured in the same manner as the upper communication oil passage 73. It should be noted, however, that the lower communication oil passage 74 is disposed below the upper communication oil passage 73. Here, it is suitable that the lower communication oil passage 74 is disposed below a horizontal plane including the axis of the first support projecting portion 12 at the portion of abutment between the first support bearing 5 and the first support projecting portion 12, and more preferably disposed within the range of 45° on both sides in the circumferential direction C with reference to a plane including the axis of the first support projecting portion 12 and extending vertically downward. In the embodiment, the lower communication oil passage 74 is disposed in the lowermost portion of the first support projecting portion 12 that is a position vertically below the axis of the first support projecting portion 12. In a preferred embodiment of the present invention, the shape, the area, etc. of the cross section of the lower communication oil passage 74 in the direction orthogonal to the direction in which the lower communication oil passage 74 extends is made different from those of the upper communication oil passage 73, in order to adjust the amount of oil flowing through the lower communication oil passage 74 with respect to the amount of oil flowing through the upper communication oil passage 73. Provision of the lower communication oil passage 74 enables oil accumulated inside the inside housing space 71 to be discharged to the outside from the lower communication oil passage 74. Here, the lower communication oil passage 74 is disposed above the lowermost portion of the inner circumferential surface 3a of the cylindrical member 3, which serves as the peripheral wall surface of the inside housing space 71. Thus, the lower communication oil passage 74 functions as an oil passage that discharges only oil reaching the height of the lower communication oil passage 74 to the outside. That is, the lower communication oil passage 74 functions as a discharge oil passage for oil amount adjustment that keeps the liquid surface of oil inside the inside housing space 71 to a level below the lower communication oil passage 74.

In addition, as shown in FIG. 3, the cylindrical member 3 includes a discharge oil passage 75 that communicates between the inner circumferential surface 3a and the outer circumferential surface 3b. An inner circumferential opening portion 75a, which is an opening portion of the discharge oil passage 75 on the inner circumferential surface 3a side, is disposed on the opposite side of the ring gear 41 from the first support bearing 5 (the second axial direction L2 side of the ring gear 41). In the embodiment, the inner circumferential opening portion 75a of the discharge oil passage 75 opens in a portion of the inner circumferential surface 3a of the cylindrical member 3 located between the ring gear 41 and the second support bearing 61 in the axial direction L. In addition, an outer circumferential opening portion 75b, which is an opening portion of the discharge oil passage 75 on the outer circumferential surface 3b side, opens in a portion of the outer circumferential surface 3b of the cylindrical member 3 located between the counter drive gear 32 and the parking gear 33 in the axial direction L. Therefore, in the illustrated example, the discharge oil passage 75 is formed as a straight oil passage inclined with respect to the radial direction R such that the inner circumferential opening portion 75a is positioned on the second axial direction L2 side of the outer circumferential opening portion 75b. The discharge oil passage 75 may be provided at a plurality of locations along the circumferential direction C of the cylindrical member 3. In the embodiment, however, the discharge oil passage 75 is provided at only one location in the circumferential direction C. The discharge oil passage 75 discharges oil accumulated in the inside housing space 71 to the outside utilizing a centrifugal force caused by rotation of the cylindrical member 3. That is, the discharge oil passage 75 functions as an oil passage that discharges oil at all times during rotation of the cylindrical member 3. In addition, since the inner circumferential opening portion 75a of the discharge oil passage 75 is disposed on the second axial direction L2 side of the ring gear 41, oil supplied from the upper communication oil passage 73, which is provided on the first axial direction L1 side of the ring gear 41, does not reach the inner circumferential opening portion 75a of the discharge oil passage 75 before passing through the planetary gear mechanism 4 in the axial direction L. Thus, the planetary gear mechanism 4 is reliably lubricated before oil is discharged from the discharge oil passage 75.

The vehicle drive device A according to the embodiment includes the structure for supplying oil to the planetary gear mechanism 4 described above. Thus, lubricating oil can be appropriately supplied to the planetary gear mechanism 4 in the inside housing space 71 even if the oil pump driven by the internal combustion engine IE is stopped. That is, as described above, the oil collecting portion 21 is configured to receive and collect oil thrown up by rotation of the differential input gear 85a, the second rotary electric machine output gear 88, and so forth forming the power transfer mechanism T, as indicated by the broken arrows in FIG. 4. Thus, oil is supplied to the oil collecting portion 21 with the gears of the power transfer mechanism T rotating, irrespective of the operating state of the oil pump. Then, as indicated by the broken arrows in FIGS. 1 and 3, the oil collected by the oil collecting portion 21 flows downward through the collected oil falling passage 22 to be supplied to a portion of the first facing wall surface 11 located above the cylindrical member 3. The oil supplied to the first facing wall surface 11 flows into the upper communication oil passage 73 through the axial end gap 72. In this case, the first facing wall surface 11 is provided with the pair of projecting streak portions 13A and 13B that project from the first facing wall surface 11 to extend in the radial direction R along the first facing wall surface 11. Thus, oil supplied to the first facing wall surface 11 is guided by the pair of projecting streak portions 13A and 13B to flow into the upper communication oil passage 73. In addition, the restriction member 55 which restricts entry of oil into a space between the inner race 51 and the outer race 52 is provided in the first axial direction end surface 54 of the first support bearing 5. Thus, entry of oil flowing along the first facing wall surface 11 into a space between the inner race 51 and the outer race 52 of the first support bearing 5 is restricted to allow most of the oil supplied to the first facing wall surface 11 to flow into the upper communication oil passage 73, and to allow a reduction in drag resistance of oil against rotation of the rolling elements of the first support bearing 5. Then, the oil flowing into the upper communication oil passage 73 is supplied into the inside housing space 71 through the upper communication oil passage 73. This allows oil to be appropriately supplied to the planetary gear mechanism 4 housed in the inside housing space 71.

Oil supplied into the inside housing space 71 from the upper communication oil passage 73 is discharged from the discharge oil passage 75 or the lower communication oil passage 74 after lubricating the planetary gear mechanism 4. As described above, the discharge oil passage 75 is configured to discharge oil inside the inside housing space 71 at all times during rotation of the cylindrical member 3. The lower communication oil passage 74 is configured to discharge only oil reaching the height of the lower communication oil passage 74 to the outside, and to permit a predetermined amount of oil to be accumulated inside the inside housing space 71 to a level below the lower communication oil passage 74. That is, the lower communication oil passage 74 functions as an oil passage that adjusts the amount of oil when the amount of oil supplied to the inside housing space 71 is larger than the amount of oil discharged from the discharge oil passage 75. In the case where the amount of oil supplied to the inside housing space 71 is small, on the other hand, oil supplied from the upper communication oil passage 73 does not reach the inner circumferential opening portion 75a of the discharge oil passage 75 before passing through the planetary gear mechanism 4 in the axial direction L since the inner circumferential opening portion 75a of the discharge oil passage 75 is disposed opposite to the upper communication oil passage 73 across the ring gear 41. Thus, the planetary gear mechanism 4 can be lubricated reliably even in the case where the amount of oil is small.

4. Other Embodiments

Lastly, other embodiments of the present invention will be described. The configuration of each embodiment described below is not limited to its independent application, and may be applied in combination with the configuration of other embodiments unless any contradiction occurs.

(1) In the embodiment described above, the collected oil falling passage 22 is a through hole provided in the bottom portion 21a of the oil collecting portion 21. However, the collected oil falling passage 22 may be configured differently as long as oil collected by the oil collecting portion 21 is allowed to flow downward to be supplied to the first facing wall surface 11. For example, in a preferred embodiment of the present invention, the collected oil falling passage 22 may be formed by a hole formed inside a wall of the case CS, a groove formed in a wall surface in the case CS, or the like, or may be formed by a tubular member or a gutter-like member disposed in the case CS.

(2) In the embodiment described above, the lower end portion of the collected oil falling passage 22 is provided at a position in contact with a portion of the first facing wall surface 11 located above the cylindrical member 3. However, it is only necessary that the collected oil falling passage 22 should be configured to supply oil to a portion of the first facing wall surface 11 located above the cylindrical member 3. Thus, in a preferred embodiment of the present invention, the lower end portion of the collected oil falling passage 22 is disposed at a position spaced from the first facing wall surface 11 in the axial direction L by a distance determined in advance. Also in this case, oil falling down from the lower end portion of the collected oil falling passage 22 is splashed by rotation of the cylindrical member 3 or the like so that at least part of the oil reaches the first facing wall surface 11. In another preferred embodiment of the present invention, the collected oil falling passage 22 is formed such that the lower end portion of the collected oil falling passage 22 opens in the first facing wall surface 11. In this case, it is suitable that the collected oil falling passage 22 is formed such that at least a part of the collected oil falling passage 22 passes inside the first support wall portion 1 with its terminal end portion opening in a portion of the first facing wall surface 11 located above the cylindrical member 3.

(3) In the embodiment described above, oil thrown up by rotation of rotary members such as gears forming the power transfer mechanism T is supplied to the oil collecting portion 21. However, supply of oil to the oil collecting portion 21 may be performed by a method other than throwing up by gears. For example, in a preferred embodiment of the present invention, an oil pump driven by rotation of a rotary member forming the power transfer mechanism T is provided so that oil sucked from the lower portion of the case CS by the oil pump is supplied to the oil collecting portion 21.

(4) In the embodiment described above, both the upper communication oil passage 73 and the lower communication oil passage 74 are formed in the outer circumferential surface 12a of the first support projecting portion 12. However, it is only necessary that the upper communication oil passage 73 and the lower communication oil passage 74 should be provided at a portion of abutment between the first support bearing 5 and the first support projecting portion 12 so as to communicate between the axial end gap 72 and the inside housing space 71. Thus, in a preferred embodiment of the present invention, one or both of the upper communication oil passage 73 and the lower communication oil passage 74 are formed in the inner circumferential surface 51a of the first support bearing 5, or in both the outer circumferential surface 12a of the first support projecting portion 12 and the inner circumferential surface 51a of the first support bearing 5. More specifically, it is also suitable that one or both of the upper communication oil passage 73 and the lower communication oil passage 74 are a recessed groove-like portion formed in the inner circumferential surface 51a of the first support bearing 5 to extend in the axial direction L, or a recessed groove-like portion formed in both the outer circumferential surface 12a of the first support projecting portion 12 and the inner circumferential surface 51a of the first support bearing 5 to extend in the axial direction L.

(5) In the embodiment described above, the first support bearing 5 and the second support bearing 61 are each a roller bearing. However, embodiments of the present invention are not limited thereto. That is, other types of bearings such as slide bearings may be used as one or both of the first support bearing 5 and the second support bearing 61.

(6) In the embodiment described above, the restriction member 55 is provided in the first axial direction end surface 54 of the first support bearing 5. However, embodiments of the present invention are not limited thereto. That is, in order to reduce the drag resistance of the first support bearing 5 due to oil accumulated in the inside housing space 71, it is suitable to provide a similar restriction member in the end surface of the first support bearing 5 on the second axial direction L2 side. In this case, it is possible to provide a restriction member in both surfaces of the first support bearing 5 in the axial direction L, or to provide a restriction member in only the end surface of the first support bearing 5 on the second axial direction L2 side. For the purpose of reducing the drag resistance due to oil accumulated in the inside housing space 71, it is suitable to also provide a similar restriction member in the end surface of the second support bearing 61 on the first axial direction L1 side.

(7) In the embodiment described above, the vehicle drive device A includes the lower communication oil passage 74. However, provision of the lower communication oil passage 74 is not essential. In a preferred embodiment of the present invention, only the upper communication oil passage 73 is provided at a portion of abutment between the first support bearing 5 and the first support projecting portion 12. Even with such a configuration, oil inside the inside housing space 71 can be discharged appropriately by providing the discharge oil passage 75.

(8) In the embodiment described above, the cylindrical member 3 is provided with the discharge oil passage 75. However, provision of the discharge oil passage 75 is not essential. In a preferred embodiment of the present invention, the discharge oil passage 75 is not provided. Even in this case, more than a necessary amount of oil can be discharged appropriately, while allowing a predetermined amount of oil to be accumulated inside the inside housing space 71, by providing the lower communication oil passage 74. The vehicle drive device A may be configured to include none of the discharge oil passage 75 and the lower communication oil passage 74.

(9) In the embodiment described above, the inner circumferential opening portion 75a of the discharge oil passage 75 is disposed on the opposite side of the ring gear 41 from the first support bearing 5 (on the second axial direction L2 side of the ring gear 41). However, embodiments of the present invention are not limited thereto. Thus, in a preferred embodiment of the present invention, for example, the inner circumferential opening portion 75a of the discharge oil passage 75 is disposed on the first support bearing 5 side of the ring gear 41, or disposed in a tooth surface of the ring gear 41.

(10) In the embodiment described above, the outer circumferential opening portion 75b of the discharge oil passage 75 opens between the counter drive gear 32 and the parking gear 33 in the axial direction L. However, the outer circumferential opening portion 75b of the discharge oil passage 75 may be disposed at any position only if the outer circumferential opening portion 75b communicates with the outer circumferential surface 3b of the cylindrical member 3. For example, in a preferred embodiment of the present invention, the outer circumferential opening portion 75b opens in a tooth surface of the counter drive gear 32 or the parking gear 33. In another preferred embodiment of the present invention, the outer circumferential opening portion 75b opens in the first axial direction end surface 3c or the second axial direction end surface 3d of the cylindrical member 3. In this case, it is also suitable that the discharge oil passage 75 is formed in a portion of abutment between the outer circumferential surface of the first support bearing 5 or the second support bearing 61 and the inner circumferential surface 3a of the cylindrical member 3.

(11) In the embodiment described above, the first support wall portion 1 is provided with the pair of projecting streak portions 13A and 13B. However, embodiments of the present invention are not limited thereto. For example, in a preferred embodiment of the present invention, only one projecting streak portion 13 is provided. Also in this case, the projecting streak portion 13 is disposed so as to guide oil flowing out of the collected oil falling passage 22 toward the upper communication oil passage 73. It is also suitable that the first support wall portion 1 includes three or more projecting streak portions 13. It is also possible that the first support wall portion 1 includes no projecting streak portions 13.

(12) In the embodiment described above, each of the projecting streak portions 13 is a projecting streak that is straight as seen in the axial direction L and that extends obliquely upward toward the radially outer side. However, embodiments of the present invention are not limited thereto. For example, in a preferred embodiment of the present invention, each of the projecting streak portions 13 is a projecting streak that is curved as seen in the axial direction L. Also in this case, it is suitable that each of the projecting streak portions 13 is disposed to extend obliquely upward toward the radially outer side when seen as a whole single projecting streak portion 13.

Figure 5:
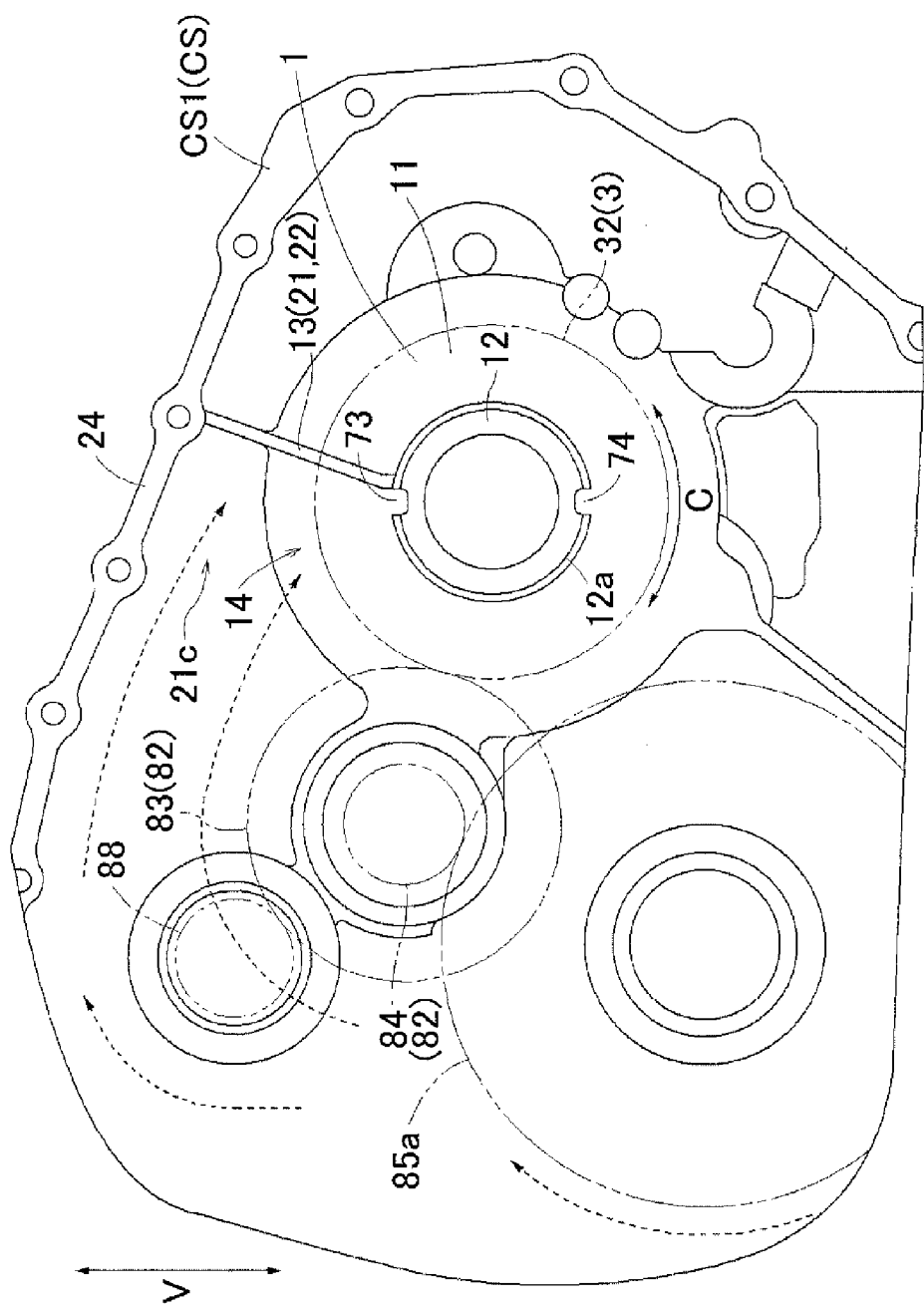
FIG. 5 is a view of a facing wall surface of a vehicle drive device according to another embodiment of the present invention as seen in the axial direction.

(13) In the embodiment described above, the first projecting streak portion 13A and the second projecting streak portion 13B are the same as each other in all of the projection height from the first facing wall surface 11, the width in the circumferential direction C, and the cross-sectional shape. However, embodiments of the present invention are not limited thereto. In a preferred embodiment of the present invention, the first projecting streak portion 13A and the second projecting streak portion 13B are different from each other in at least one of the projection height from the first facing wall surface 11, the width in the circumferential direction C, and the cross-sectional shape. In this case, for example, it is also suitable that the projection height from the first facing wall surface 11 of the second projecting streak portion 13B is larger than that of the first projecting streak portion 13A. With such a configuration, the second projecting streak portion 13B can receive and collect oil thrown up by rotation of rotary members (specifically, the differential input gear 85a and the counter gear mechanism 82) such as gears forming the power transfer mechanism T. Then, oil collected in this way flows downward along the second projecting streak portion 13B to be supplied to the first facing wall surface 11. In addition, it is also suitable to provide only one projecting portion 13 corresponding to the second projecting streak portion 13B without providing the first projecting streak portion 13A. In such a case, in which oil can be collected by at least one projecting portion 13, the projecting portion 13 forms the oil collecting portion and the collected oil falling passage according to the present invention. In the case where the oil collecting portion and the collected oil falling passage formed by the projecting portion 13 are provided, provision of the oil collecting portion 21 and the collected oil falling passage 22 such as those described above in relation to the embodiment is not essential, and a configuration shown in FIG. 5 that is not provided with such components, for example, is also suitable. That is, the oil collecting portion and the collected oil falling passage formed by the projecting portion 13 function as the oil collecting portion and the collected oil falling passage, respectively, according to the present invention, either in cooperation with the oil collecting portion 21 and the collected oil falling passage 22 such as those described above in relation to the embodiment or singly. As shown in FIG. 5, in the case where the oil collecting portion and the collected oil falling passage are formed by only the projecting portion 13, it is suitable to extend the projecting portion 13 further on the radially outer side compared to the second projecting streak portion 13B in the embodiment described above, because more of the oil thrown up by rotation of the power transfer mechanism T can be received. In the illustrated example, a radially outer end portion of the projecting portion 13 contacts the inner surface of the peripheral wall portion 24 of the case CS. Although not shown, a gap may be provided between a radially outer end portion of the projecting portion 13 and the inner surface of the peripheral wall portion 24 of the case CS.

(14) In the embodiment described above, the vehicle drive device A includes the first rotary electric machine MG1 and the second rotary electric machine MG2 disposed on different axes. However, embodiments of the present invention are not limited thereto. That is, in a preferred embodiment of the present invention, the first rotary electric machine MG1 and the second rotary electric machine MG2 are disposed coaxially with each other. In another preferred embodiment of the present invention, the vehicle drive device A is formed as a drive device for a one-motor parallel hybrid vehicle including only one rotary electric machine.

(15) In the embodiment described above, the planetary gear mechanism 4 is housed in the inside housing space 71. However, the gear mechanism housed in the inside housing space 71 and therefore supplied with oil according to the present invention is not limited to such a gear mechanism, and may be various types of gear mechanisms known in the art.

(16) In the embodiment described above, the ring gear 41 of the planetary gear mechanism 4 is formed on the inner circumferential surface 3a of the cylindrical member 3, and the counter drive gear 32 and the parking gear 33 are formed on the outer circumferential surface 3b of the cylindrical member 3. However, embodiments of the present invention are not limited thereto. That is, the cylindrical member 3 may be configured to form the power transfer mechanism T and include internal teeth, and may be a member that transfers power at a portion that is completely different from that in the embodiment described above. For example, in a preferred embodiment of the present invention, the cylindrical member 3 may not include the parking gear 33, and another rotary element of the power transfer mechanism T may include a parking gear.

(17) Also regarding other configurations, the embodiment disclosed herein is illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a vehicle drive device including an input member drivably coupled to an internal combustion engine, a rotary electric machine, an output member drivably coupled to wheels, a power transfer mechanism that drivably couples the input member, the rotary electric machine, and the output member, and a case that houses at least the power transfer mechanism.

The invention claimed is:
1. A vehicle drive device comprising:
an input member drivably coupled to an internal combustion engine;
a rotary electric machine,
an output member drivably coupled to wheels;
a power transfer mechanism that drivably couples the input member, the rotary electric machine, and the output member; and
a case that houses at least the power transfer mechanism, wherein
the power transfer mechanism includes a cylindrical member and an inside gear mechanism,
the inside gear mechanism meshes with internal teeth provided on an inner circumferential surface of the cylindrical member, and is housed in an inside housing space formed on a radially inner side of the cylindrical member,
the cylindrical member is rotatably supported from the radially inner side by two support bearings disposed on both sides in an axial direction across the inside gear mechanism,
the case includes a support wall portion, and an oil collecting portion and a collected oil falling passage are provided inside the case,
the support wall portion includes a facing wall surface that faces an axial end surface of the cylindrical member via a gap and that extends to a radially outer side of the cylindrical member, and a support projecting portion formed on the radially inner side of the cylindrical member so as to project from the facing wall surface toward the cylindrical member,
the support projecting portion abuts against a subject support bearing, which is one of the support bearings located on a facing wall surface side, to support the subject support bearing at least from the radially inner side,
the oil collecting portion is disposed above the cylindrical member, and configured to collect oil supplied by rotation of the power transfer mechanism,
the collected oil falling passage is configured to cause the oil collected by the oil collecting portion to flow downward to be supplied to a portion of the facing wall surface located above the cylindrical member, and
a communication oil passage that communicates between the gap and the inside housing space is formed at a portion of abutment between the subject support bearing and the support projecting portion.

2. The vehicle drive device according to claim 1, wherein the subject support bearing is a roller bearing in which rolling elements are housed between an inner race and an outer race, and includes a restriction member provided in an end surface of the subject support bearing on the facing wall surface side in the axial direction to restrict entry of oil into a space between the inner race and the outer race.

3. The vehicle drive device according to claim 2, wherein
a lower communication oil passage that communicates between the gap and the inside housing space is formed at the portion of abutment between the subject support bearing and the support projecting portion and below the communication oil passage, separately from the communication oil passage.

4. The vehicle drive device according to claim 3, wherein
the cylindrical member includes a discharge oil passage that communicates between the inner circumferential surface and an outer circumferential surface, and
an opening portion of the discharge oil passage on an inner circumferential surface side is disposed on the opposite side of the internal teeth from the subject support bearing.

5. The vehicle drive device according to claim 4, wherein
the support wall portion includes a pair of projecting streak portions that project from the facing wall surface to extend in a radial direction of the cylindrical member along the facing wall surface,
the pair of projecting streak portions are disposed to extend obliquely upward such that an interval in a circumferential direction between the pair of projecting streak portions becomes larger toward the radially outer side, and
a lower end portion of the collected oil falling passage and the communication oil passage are disposed between the pair of projecting streak portions in the circumferential direction.

6. The vehicle drive device according to claim 1, wherein
a lower communication oil passage that communicates between the gap and the inside housing space is formed at the portion of abutment between the subject support bearing and the support projecting portion and below the communication oil passage, separately from the communication oil passage.

7. The vehicle drive device according to claim 1, wherein
the cylindrical member includes a discharge oil passage that communicates between the inner circumferential surface and an outer circumferential surface, and
an opening portion of the discharge oil passage on an inner circumferential surface side is disposed on the opposite side of the internal teeth from the subject support bearing.

8. The vehicle drive device according to claim 2, wherein
the cylindrical member includes a discharge oil passage that communicates between the inner circumferential surface and an outer circumferential surface, and
an opening portion of the discharge oil passage on an inner circumferential surface side is disposed on the opposite side of the internal teeth from the subject support bearing.

9. The vehicle drive device according to claim 6, wherein
the cylindrical member includes a discharge oil passage that communicates between the inner circumferential surface and an outer circumferential surface, and
an opening portion of the discharge oil passage on an inner circumferential surface side is disposed on the opposite side of the internal teeth from the subject support bearing.

10. The vehicle drive device according to claim 1, wherein
the support wall portion includes a pair of projecting streak portions that project from the facing wall surface to extend in a radial direction of the cylindrical member along the facing wall surface,
the pair of projecting streak portions are disposed to extend obliquely upward such that an interval in a circumferential direction between the pair of projecting streak portions becomes larger toward the radially outer side, and
a lower end portion of the collected oil falling passage and the communication oil passage are disposed between the pair of projecting streak portions in the circumferential direction.

11. The vehicle drive device according to claim 2, wherein
the support wall portion includes a pair of projecting streak portions that project from the facing wall surface to extend in a radial direction of the cylindrical member along the facing wall surface, the pair of projecting streak portions are disposed to extend obliquely upward such that an interval in a circumferential direction between the pair of projecting streak portions becomes larger toward the radially outer side, and a lower end portion of the collected oil falling passage and the communication oil passage are disposed between the pair of projecting streak portions in the circumferential direction.

12. The vehicle drive device according to claim 6, wherein the support wall portion includes a pair of projecting streak portions that project from the facing wall surface to extend in a radial direction of the cylindrical member along the facing wall surface, the pair of projecting streak portions are disposed to extend obliquely upward such that an interval in a circumferential direction between the pair of projecting streak portions becomes larger toward the radially outer side, and a lower end portion of the collected oil falling passage and the communication oil passage are disposed between the pair of projecting streak portions in the circumferential direction.

13. The vehicle drive device according to claim 3, wherein the support wall portion includes a pair of projecting streak portions that project from the facing wall surface to extend in a radial direction of the cylindrical member along the facing wall surface, the pair of projecting streak portions are disposed to extend obliquely upward such that an interval in a circumferential direction between the pair of projecting streak portions becomes larger toward the radially outer side, and a lower end portion of the collected oil falling passage and the communication oil passage are disposed between the pair of projecting streak portions in the circumferential direction.

14. The vehicle drive device according to claim 7, wherein the support wall portion includes a pair of projecting streak portions that project from the facing wall surface to extend in a radial direction of the cylindrical member along the facing wall surface, the pair of projecting streak portions are disposed to extend obliquely upward such that an interval in a circumferential direction between the pair of projecting streak portions becomes larger toward the radially outer side, and a lower end portion of the collected oil falling passage and the communication oil passage are disposed between the pair of projecting streak portions in the circumferential direction.

15. The vehicle drive device according to claim 8, wherein the support wall portion includes a pair of projecting streak portions that project from the facing wall surface to extend in a radial direction of the cylindrical member along the facing wall surface, the pair of projecting streak portions are disposed to extend obliquely upward such that an interval in a circumferential direction between the pair of projecting streak portions becomes larger toward the radially outer side, and a lower end portion of the collected oil falling passage and the communication oil passage are disposed between the pair of projecting streak portions in the circumferential direction.

16. The vehicle drive device according to claim 9, wherein the support wall portion includes a pair of projecting streak portions that project from the facing wall surface to extend in a radial direction of the cylindrical member along the facing wall surface, the pair of projecting streak portions are disposed to extend obliquely upward such that an interval in a circumferential direction between the pair of projecting streak portions becomes larger toward the radially outer side, and a lower end portion of the collected oil falling passage and the communication oil passage are disposed between the pair of projecting streak portions in the circumferential direction.

* * * * *